US006985750B1

(12) United States Patent
Vicknair et al.

(10) Patent No.: US 6,985,750 B1
(45) Date of Patent: Jan. 10, 2006

(54) WIRELESS NETWORK SYSTEM

(75) Inventors: Bruce A. Vicknair, The Woodlands, TX (US); Bradley T. Carlson, Cypress, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 09/558,890

(22) Filed: Apr. 26, 2000

Related U.S. Application Data

(60) Provisional application No. 60/131,300, filed on Apr. 27, 1999.

(51) Int. Cl.
*H04B 7/00* (2006.01)
(52) U.S. Cl. ...................................... 455/519; 370/310
(58) Field of Classification Search ................ 370/277, 370/278, 279, 280, 282, 293, 294, 295, 320, 370/389, 441, 338, 252, 310, 335; 166/65.1, 166/66, 250.1; 375/132; 455/519
See application file for complete search history.

(56) References Cited

U.S. PATENT DOCUMENTS

| 5,029,183 | A |   | 7/1991  | Tymes ........................... 375/1 |
|-----------|---|---|---------|---------------------------------------|
| 5,103,461 | A |   | 4/1992  | Tymes ........................... 375/1 |
| 5,142,550 | A |   | 8/1992  | Tymes ........................... 375/1 |
| 5,157,687 | A |   | 10/1992 | Tymes ........................... 375/1 |
| 5,276,703 | A | * | 1/1994  | Budin et al. ................ 375/130 |
| 5,280,498 | A |   | 1/1994  | Tymes et al. .................... 375/1 |
| 5,287,384 | A |   | 2/1994  | Avery et al. .................... 375/1 |
| 5,386,435 | A |   | 1/1995  | Cooper et al. ................... 375/1 |
| 5,479,441 | A |   | 12/1995 | Tymes et al. ................. 375/200 |
| 5,487,069 | A |   | 1/1996  | O'Sullivan et al. ........ 370/94.3 |
| 5,528,621 | A |   | 6/1996  | Heiman et al. ............. 375/200 |
| 5,533,025 | A |   | 7/1996  | Fleek et al. ................. 370/85.2 |
| 5,621,417 | A |   | 4/1997  | Hassan et al. .............. 342/457 |
| 5,657,317 | A |   | 8/1997  | Mahany et al. ............. 370/338 |
| 5,668,803 | A |   | 9/1997  | Tymes et al. ............... 370/312 |
| 5,682,139 | A |   | 10/1997 | Pradeep et al. ............. 340/539 |
| 5,691,980 | A |   | 11/1997 | Welles, II et al. .......... 370/316 |
| 5,696,903 | A |   | 12/1997 | Mahany .................. 395/200.58 |
| 5,726,984 | A |   | 3/1998  | Kubler et al. ............... 370/349 |
| 5,742,509 | A |   | 4/1998  | Goldberg et al. ........ 364/449.5 |
| 5,777,580 | A |   | 7/1998  | Janky et al. ................. 342/457 |
| 5,790,536 | A |   | 8/1998  | Mahany et al. ............. 370/338 |
| 5,796,602 | A | * | 8/1998  | Wellan et al. .................. 700/1 |
| 5,796,832 | A |   | 8/1998  | Kawan ........................ 380/24 |
| 5,822,361 | A |   | 10/1998 | Nakamura et al. .......... 375/202 |
| 6,292,108 | B1| * | 9/2001  | Straser et al. .......... 340/870.11 |
| 6,324,607 | B1| * | 11/2001 | Korowitz et al. ........... 710/300 |
| 6,377,189 | B1| * | 4/2002  | Newman ................. 340/854.6 |
| 6,493,679 | B1| * | 12/2002 | Rappaport et al. ............ 705/29 |

OTHER PUBLICATIONS

"BJ Job Master".

(Continued)

*Primary Examiner*—Duc Ho
*Assistant Examiner*—Thien D Tran
(74) *Attorney, Agent, or Firm*—O'Keefe, Egan & Peterman, LLP

(57) ABSTRACT

Wireless local area networks ("wireless networks") used to interrelate individual mobile nodes, and having the capability of automatically establishing and/or modifying functionality of a network in response to the characteristics and/or identity of the nodes connected to the network at a given time. The wireless networks may be mobile, and may be employed in applications using service vehicles, such as truck, skid and trailer mounted equipment used in the well servicing industry, delivery or maintenance trucks, railroad service vehicles, aircraft, or off-shore service vehicles.

49 Claims, 6 Drawing Sheets

OTHER PUBLICATIONS

"BJ Lan Protocol Master Command," pp. 31-35.
"Ethernet Bridges," Wi-LAN, Inc., Mar. 17, 1999.
"Radio Operation, Synchronization and Registration," *Digital Wireless Corporation,* pp. 4-5, Firmware 1.0, Apr. 9, 1999.
"SNAP2410 2.4 GHz Frequency Hopping Spread Spectrum Network Access Point with 10Base-T," *Digital Wireless Corporation,* Norcross, GA, Jan. 19, 1999.
"WIT2410 Roaming Frequency Hopping Transceiver OEM Module," *Digital Wireless Corporation,* Norcross, GA, Jan. 22, 1999.
"WIT2410 Wireless Industrial Transceiver MRP Protocol Description (Preliminary),", *Digital Wireless Corporation,* Norcross, GA, Mar. 30, 1999.
Eroglu, "Worldwide Compliance for WLAN Devices," *Intermec Technologies Corporation,* Wireless Spring 1999 Conference, Feb., 1999.
Newman, "Wireless LANs: How Far? How Fast?," www.data.com, Mar. 21, 1995.
Chaudhary, et al. "Brief: Modem Transmission of Data for 3D Fracture Modeling," JPT, 498, 500 (Jun. 1996).

* cited by examiner

WIRELESS NETWORK SYSTEM

The present application claims priority on now abandoned U.S. provisional patent application Ser. No. 60/131,300 filed on Apr. 27, 1999. The entire text and all contents of the above referenced disclosure is specifically incorporated herein by reference without disclaimer.

BACKGROUND

1. Field of the Invention

This invention relates generally to wireless local area networks, and in one example, to mobile wireless local area networks used to interrelate individual mobile nodes. In one embodiment, this invention relates to wireless local area networks having the capability of automatically establishing and/or modifying functionality of a network in response to the characteristics and/or identity of the nodes connected to the network at a given time.

2. Description of the Related Art

Local area networks ("LANs") allow a group of devices (e.g., computers, workstations, printers, file storage devices, and other devices) to communicate and exchange information and share resources over a limited area using a predetermined software protocol. Each device connected to the LAN may be referred to as a "node." The nodes communicate using a software protocol, which is an electronic method of communicating using a formal set of conventions governing the format and relative timing of electronic messages exchanged between nodes in the LAN.

In the past, LANs have utilized hardwire connections with hardware interfaces that allow individual devices or nodes to access the network. Within each node, an executable software program interprets the signals transmitted on the network between the nodes. Individual nodes of a hardwired LAN may be moved and connected to a new wired network of a like kind, thus becoming part of a new LAN. However, disconnecting and reconnecting hardware components of a LAN is often inconvenient and time consuming.

Just one example of an application for a LAN is for interrelating sensor and/or control devices employed when performing well treatments, such as well stimulations. Such well treatments are typically performed in the field using mobile vehicle mounted equipment, including pumps, vessels, mixing equipment, etc. The number and characteristics of individual components of such equipment is typically dependent on factors such as the size and type of the well treatment job to be performed. Individual components of the mobile equipment are typically assembled and connected with flowlines at the wellsite. Hardwire communication and data lines are typically employed to transmit voice and data (e.g., sensor readings and control signals) between individual nodes. In this capacity, treatment conditions (e.g., pumping pressures, volumes pumped, and temperatures) may be monitored and/or recorded, while treatment control parameters (e.g., pumping rate and mixing volumes) may be automatically and/or remotely controlled in response to measured treatment conditions. In one example, treatment conditions may be monitored for safety concerns (such as over pressure conditions) and the necessary control steps may be automatically taken to address the safety concerns (such as pump shut-down).

Although LANs may be used to provide increased control and efficiency to well treatment operations, a large number of wires or cables are typically required to be brought to the wellsite and strung between individual pieces of vehicle-mounted equipment prior to a job, and removed thereafter. This is typically a time consuming and manpower-intensive process. Reliability of such hardwired connections may also be less than desired. Furthermore, each well treatment may be unique, requiring different types of nodes, equipment, and combinations thereof, to communicate and exchange data. As a result, individual nodes of a LAN must typically be reconfigured, modified, and/or replaced according to the characteristics of the equipment combination employed for a given job. This is also typically a time-consuming and manpower intensive process. For example, well servicing equipment nodes in a LAN at a wellsite location often require changes in the system configuration when reconfiguring the equipment or adding nodes to the LAN. Once again, this may also require time-consuming intervention on the part of a service engineer (e.g., field technician, network administrator, etc.).

Hardware and software has now evolved so that network communication between two or more devices in a LAN may now be by wireless communication, such as using optical transmission or radio frequency (RF) broadcast. The use of wireless communications simplifies movement and connection of such devices. A wireless LAN may be established when two or more devices with compatible wireless communication hardware and software are within communication range. In a typical wireless LAN, a "master" or "base" node is used to orchestrate communication between individual nodes. Individual nodes may be moved while maintaining contact with the network, or nodes may re-establish contact with the network when contact between nodes is lost.

Wireless LANs solve some of the problems encountered with traditional LANs because hardwired connections are not required. However, existing wireless networks typically operate with strict limitations as to the communication protocol and network functionality. Because devices communicating in a wireless LAN have set and defined functionality, changes to network set-up and modifications or substitutions of devices are often required when configuring a wireless LAN at a new location.

SUMMARY OF THE INVENTION

Disclosed herein are methods and systems for providing wireless networks that have communication functions of standard wireless networks, such as standard wireless LANs, but that offer increased flexibility and ease in changing system configuration when adding nodes to a network, and/or establishing or modifying functionality of a network as nodes become connected. Advantageously, embodiments of the disclosed wireless networks may be dynamic in nature, i.e., characteristics of network functionality may change with time, and in embodiments employing one or more mobile nodes may be further characterized as mobile wireless networks.

As used herein, "node functionality" means functions, characteristics and/or parameters associated with an individual piece of equipment associated with a given node, e.g., equipment type (e.g., pump truck, blender, delivery truck, master control van), equipment characteristic (e.g., engine model, pump capacity, horsepower, carrying capacity), etc. "Network functionality" means one or more selected or inherent characteristics possessed or performed by a given network, including network algorithms, checklists or other routines. One example of network functionality includes well treatment simulation routines performed by an optional computer (e.g., "job control PC") or other processor (e.g., systems available from UNIX, IBM, SUN MICROSYSTEMS; systems running MICROSOFT WINDOWS NT, etc.) attached to a master node during a well treatment to accept and monitor acquired data from the master node, verify presence of necessary nodes or associated equipment, monitor conformance with safety parameters, identify and/or request needed equipment, identify and/or release excess equipment, combinations of these functions, etc. Network algorithms, checklists or other routines may be present, for example, as software code in a processor or computer connected to one or more nodes of a network (e.g., master or base node, etc.), in a processor or computer present at or connected to a remote location (e.g., field or district office, etc.), or present in any other form and/or location suitable for interfacing with a wireless network disclosed herein. Such network algorithms or other routines may operate or function automatically or autonomously, may function in conjunction with manual (human) input and/or decision-making, or with any combination thereof.

For example, different types and sizes of well treatments (e.g., hydraulic fracture stimulations, acid stimulations, cementing operations, coiled tubing operations, sand control operations such as gravel packing or frac packs, etc.) may require distinct types and/or numbers of individual well treating equipment (e.g., pump trucks, blenders, storage tanks, tank trucks, frac tanks, etc.). Based on the type and/or size of well treatment being performed, network algorithms or other routines may be employed to verify that sufficient types and numbers of different equipment are present at a wellsite to adequately and safely perform a particular type and/or size of well treatment. For example, should a particular type of required equipment be missing (e.g., blender required for a frac job, etc.); a particular type of required equipment be deficient in quantity, type and/or size (e.g., insufficient total horsepower or number of pump trucks to obtain sufficient pump rate based on anticipated treatment conditions, etc.); a particular fluid or solid material be present in insufficient volume (e.g., water, nitrogen, carbon dioxide, polymer material, acid, cement, etc.); or any other such parameter be found wanting or deficient, a network algorithm or other routine may inform or otherwise alert a field technician, remote location, etc. in any suitable manner (e.g., by message on a CRT screen, indicator light, etc.). Furthermore, in one embodiment such a network algorithm or other routine may automatically and/or autonomously notify, request or otherwise direct that additional and/or replacement equipment, material, etc. as appropriate report to the wellsite. Conversely, surplus or unneeded equipment or material may be similarly identified and personnel associated with such equipment directed to remove the equipment from the wellsite so that it may be employed elsewhere. This may be done, for example, by direct wireless communication with individual nodes present at a wellsite (or not present at the wellsite, but within reliable communication proximity), by communication with a remote location (district office, field office, etc.) or other suitable means.

Network algorithms or other routines may also monitor acquired data on a real time basis (e.g., pressures, temperatures, viscosities, fluid or solid material consumption rates, remaining stored fluid or stored solid volumes, etc.) and use such data to monitor conformance of the job to safety parameters (e.g., maximum pressures, maximum temperatures, evidence of leaks, etc.), monitor conformance of the job to simulated well treatment performance (e.g., anticipated successful well fracture performance based on pre-job "mini frac" pressure fall-off simulation, well treatment model/simulator such as frac or acid model, etc.), etc. Well treatment model/simulators are known in the art and examples include, but are not limited to, "MACID" employed by "BJ SERVICES" and available from Meyer and Associates of Natrona Heights, Pa.; "FRACPRO" from Resources Engineering Services; "FRACPRO PT", available from Pinnacle Technology or San Francisco, Calif., etc.

Well treating equipment may also be monitored in real time for mechanical failure or performance problems by network algorithms or other routines. Once again, safety problems, mechanical problems, emergency conditions, etc. may be detected by a network algorithm or other routine and acted upon, by reporting to a local on-site field technician, reporting to a remote location, reporting to onsite or offsite nodes, or combinations thereof. In one embodiment, where mechanical problems are detected with a particular piece of equipment during a job, available information on the problem (e.g., type, severity, etc.) may be noted in a job record file, reported to a remote location, and/or the node associated with the particular piece of equipment instructed to report the problem to its home office upon next contact with the same. Furthermore, maintenance personnel and/or supplies may be requested to report to the jobsite, as appropriate. Furthermore, the node associated with the identified piece of equipment may optionally be instructed to report to a maintenance facility, immediately (and a replacement optionally ordered) or upon job completion.

Just a few examples of other network functionalities that may be performed by an network algorithm or other routine include, but are not limited to, reporting of well treatment data and node status/performance to a remote location (real time, or delayed); reporting of job initiation, termination, or delays to a remote location; storage of the foregoing information, commands to individual equipment directing certain actions be performed or modified (e.g., change in pump rate, open/close valve, shut down, start up, alarm, etc.), etc.

In a given case, the particular type of well treatment being performed and/or the desired algorithm, checklist or other routine may be manually input into a processor or manually selected in a processor by a field technician, remote location, etc. Alternatively, in another embodiment an algorithm or other routine may be employed to automatically identify or characterize a particular type well treatment and/or requirements for such a treatment based on a "roll call" or inventory of nodes present at a particular location and/or the respective node functionalities associated with the same. Based on such an automatic identification or characterization, any one or more network functionalities appropriate for the particular type of job may be performed (e.g., including those described above).

Thus, it will be understood and appreciated with benefit of this disclosure that network functionality may be input and modified manually (by human operator input) and/or automatically (without human operator input), or a combination thereof. It will also be understood that network functionality may encompass a broad range of functions, e.g., from alerts to field technicians who may act on the alert, to automatic messages to one or more nodes or remote locations, to automatic commands to particular equipment to change operation or function. Furthermore, although network functionality has been described above in terms of well treating equipment, it will be understood with benefit of this disclosure by those of skill in the art that appropriate network functionalities may exist with other embodiments of the disclosed wireless networks employed in other industries, such as those listed or described elsewhere herein.

In one disclosed embodiment, the functionality of a LAN may be determined at any particular time by the nature and number of nodes connected, the particular attached I/O devices, and/or the loaded functional and descriptor code in each node. Such a network may be assembled by bringing at least two nodes into reliable communication proximity, meaning signal communication is sufficiently reliable for the nodes to exchange data, commands and information, as described elsewhere herein. Each node includes core software code, which may be used to facilitate the exchange of node descriptor information, to determine if a master is needed, and/or to determine the network capability.

In another embodiment, one or more nodes of a mobile wireless LAN may be provided with the capability of long range communication (e.g., via microwave, satellite, or long range RF communication links). While the functionality and operation of such a wireless LAN may be related to its short range communication area, a node may send and receive its functional or descriptor code, or the functionality of the network, to a remote location via a long range communication link. Such a remote location may be capable of simultaneously monitoring the condition and modifying the characteristics of multiple LANs and/or internetworking such LANs. For example, the descriptor or functional information of a node, or the functionality of an entire LAN, may be modified and/or monitored from a remote location on a real-time basis.

Although any suitable communication mode may be employed, one disclosed embodiment utilizes nodes that communicate within a wireless LAN (also referred to as a "WLAN") using frequency-hopping spread spectrum communication technology. However, regardless of communication type, wireless nodes of a WLAN may be self-powered and have some amount of functionality useful within the network. Just a few examples of devices that may be connected at a node are devices having input/output capability including, but not limited to, devices such as sensors, recorders, actuators, solenoids, audio microphones, speakers, display screens, processors, or the like. Other examples include, but are not limited to, devices such as controllable valves, engine throttle actuators, measurement instruments, sensors (e.g., density, flow rate, pressure, temperature, viscometers, and pH sensors), or any other control or condition-sensing device known in the art for use in control and sensor equipment, for example, employed in well service applications at a well site.

In the disclosed embodiments, a node may have a unique address, processing capability, memory for program and data, and/or software code. In this regard, the software code may function to interpret data and instructions, to modify how the node functions, and/or to store descriptor information about the status and capabilities of a node. Processing capability may be provided by any suitable data processing element including, but not limited to, a microprocessor, digital signal processor, microcomputer, micro controller, laptop computer, or larger computer system. Software code incorporated in a node may be categorized as fixed "core" code that determines how each node interprets information, "functional" code that defines or alters how a node functions, and "descriptor" code that defines the capabilities and status of a node. In one embodiment, the descriptor information includes an I.D. code embedded with a description of the equipment at a node.

With benefit of this disclosure, it will be understood that embodiments of the disclosed wireless LAN system/s may be assembled in a variety of ways and for use in a variety of applications or operational tasks known in the art for which LANs, wireless LANs or other wireless networks may be employed. Such applications may have one or more mobile nodes, and may include both mobile and fixed nodes. A mobile node may include any type of node that has some amount of mobility, for example nodes and associated equipment that are attached or connected to trucks, trailers, skids, boats, aircraft, human beings, etc. Examples of such applications include, but are not limited to, the maintenance, construction, event observation, and/or reporting associated with well servicing equipment and remote control stations. Other potential applications include coiled tubing, pigging, measurement while drilling ("MWD"), refinery high pressure washing, recreational vehicle use, and nuclear waste pumping.

In one exemplary embodiment of the disclosed wireless network system/s, oil well stimulation equipment may be transported by vehicle to random job sites. Each vehicle has a roaming transceiver that announces it presence to a master control (e.g., treater's computer) at the job site. Each vehicle has a unique identification number (serial number, alpha and/or numeric designation, etc.) and a self-description or node functionality, e.g., equipment type, equipment characteristic (pump capacity, horsepower), etc. Job data is transmitted real-time to the master control.

In one respect disclosed is a wireless network, including at least two nodes in wireless communication with each other, each of the nodes having at least one of an individual node functionality characteristic or an individual node identity characteristic; wherein at least a first node of the two or more nodes is capable of transmitting at least one of its individual node functionality characteristic or its individual node identity characteristic to at least a second node of the two or more nodes; and wherein the second node is capable of establishing or modifying a network functionality of the wireless network based on respective node functionality characteristics of the first and second nodes, respective node identity characteristics of the first and second nodes, or a combination thereof.

In another respect, disclosed is a wireless network for conducting well treatment operations, including at least two nodes in wireless communication with each other, each of the nodes having at least one of an individual node functionality characteristic or an individual node identity characteristic; wherein at least a first node of the two or more nodes is capable of transmitting at least one of its individual node functionality characteristic or its individual node identity characteristic to at least a second node of the two or more nodes; wherein the second node is capable of establishing or modifying a network functionality of the wireless network based on respective node functionality characteristics of the first and second nodes, respective node identity characteristics of the first and second nodes, or a combination thereof; wherein each of the nodes are mobile nodes coupled to well treating equipment capable of assembling at a wellsite to perform a well treatment; and wherein each of the nodes are mobile nodes, and wherein the wireless network is a mobile wireless network; wherein each of the nodes includes a radio transceiver, and wherein the nodes are in communication via spread spectnum radio frequency.

In another respect, disclosed is a mobile wireless network, including a plurality of mobile secondary nodes in wireless communication with each other and a mobile master node, each of the secondary nodes having at least one of an individual node functionality characteristic or an individual node identity characteristic; wherein each of the secondary nodes is capable of transmitting at least one of its individual node functionality characteristic or its individual node identity characteristic to the master node; wherein the master node is capable of establishing a network functionality of the wireless network based on at least one of the respective secondary node functionality characteristics, the respective secondary node identity characteristics, and the number of the secondary nodes communicating in the wireless network; and wherein the master node is capable of accepting additional secondary nodes into the wireless network as the additional nodes enter into communication with the master node, and wherein the master node is capable of releasing existing nodes that terminate communication with the master node, wherein the accepting includes modifying the established network functionality of the wireless network based on the addition of at least one of respective node functionality characteristics, respective node identity characteristics of each additional node, and revised number of secondary nodes communicating in the wireless network, and wherein the releasing includes modifying the established functionality based the deletion of at least one of respective node functionality characteristics, respective node identity characteristics of the exiting node and revised number of secondary nodes communicating in the wireless network.

In another respect, disclosed is a method of performing an operational task with at least two mobile units, including assembling the at least two mobile units at a task location; and performing the operational task; wherein the at least two mobile units operate as nodes in a mobile wireless network; and wherein the at least two nodes are in wireless communication with each other, each of the nodes having at least one of an individual node functionality characteristic or an individual node identity characteristic; wherein at least a first node of the two or more nodes is capable of transmitting at least one of its individual node functionality characteristic or its individual node identity characteristic to at least a second node of the two or more nodes; and wherein the second node is capable of establishing or modifying a network functionality of the wireless network based on respective node functionality characteristics of the first and second nodes, respective node identity characteristics of the first and second nodes, or a combination thereof. An operational task may include any task for which the at least two mobile units are capable of, including any types of mobile units as described elsewhere herein. Examples of operational tasks include, but are not limited to, a well treatment operation (e.g., well stimulation, well drilling, well cementing, etc.); delivery operation (e.g., passenger, mail or freight delivery via water, ground or air vehicles; etc.); maintenance operations (ground vehicle, ship, or aircraft maintenance operations, etc.), or any other type of application or operational task described elsewhere herein. Examples of mobile units include mobile nodes and associated equipment as described elsewhere herein.

DESCRIPTION OF THE ILLUSTRATIVE EMBODIMENTS

As used herein, the indefinite articles "a" and "an" connote "one or more." Furthermore, although some exemplary embodiments herein refer to WLAN equipment, it will be understood with benefit of this disclosure that benefits of the disclosed methods and apparatus may also be practiced in other wireless network configurations, for example non-local wireless environments where long range communication is employed and/or required.

By "in signal communication" it is meant that components may be electrically connected, coupled, or otherwise configured to directly or indirectly send and receive signals including, but not limited to, electrical signals, radio signals, microwave signals, optical signals, ultrasonic signals, etc. By "in wireless communication" it is meant that components are in signal communication via any type of wireless signal/s known in the art suitable for sending and/or receiving communication signals. "Acquired data" includes any information gathered from one or more sources (e.g., sensing devices, keypads, audio microphone, etc.) including, but not limited to, well treatment condition information, vehicle operating condition information, operator input information, etc. "Network information" means any information or data concerning the status of individual nodes or the network as a whole including, but not limited to, information on node identity, node input/output devices, node functionality, network functionality, etc. "Network instructions" means any instructions or commands directed to individual nodes, groups of nodes, or a network as a whole, including, but not limited to, commands related to changes in node functionality, changes in node identity, redeployment of one or more nodes or entire network, etc.

Figure 1:
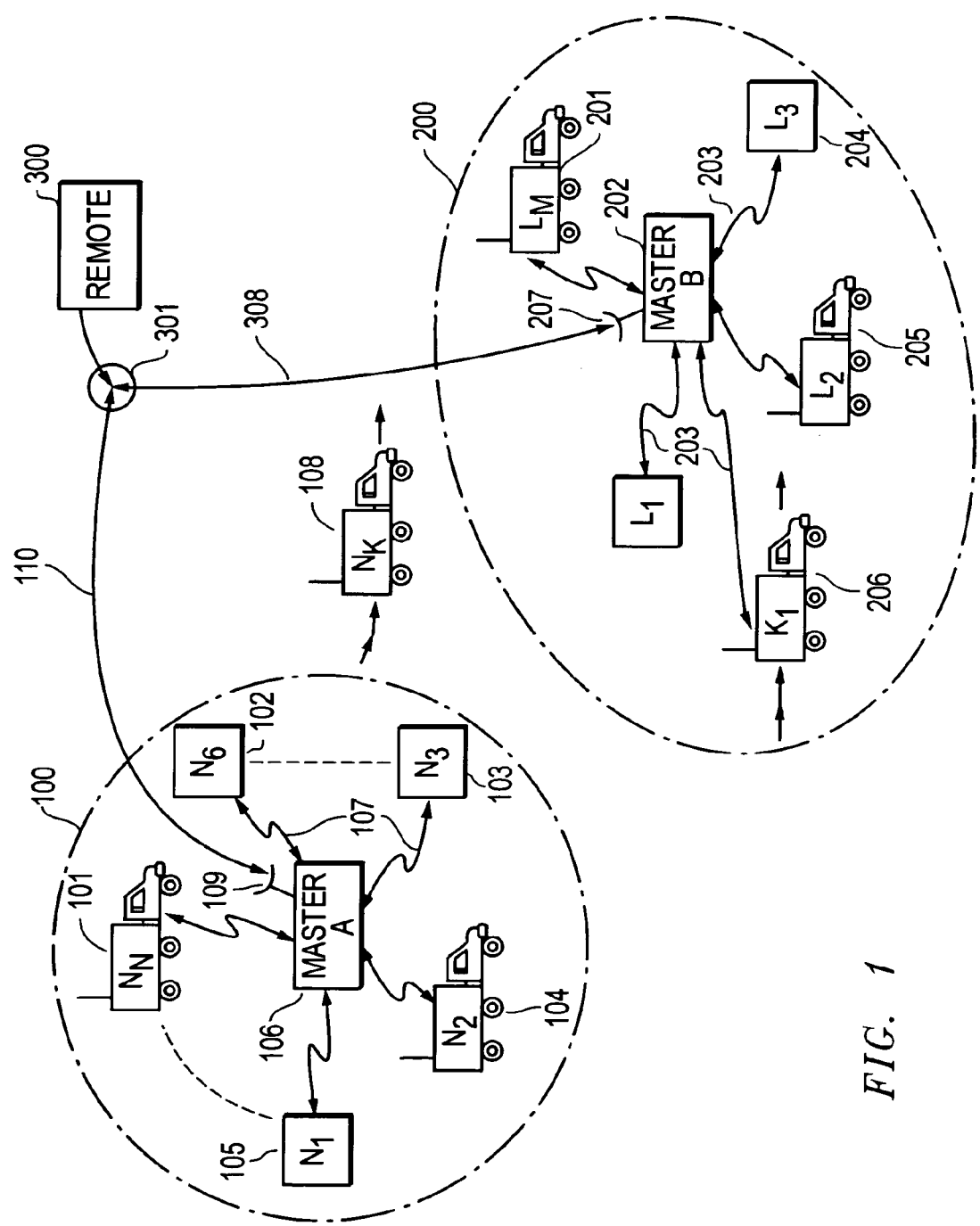
FIG. 1 is an illustrative embodiment having two interconnected mobile, wireless networks communicating to a remote site according to one embodiment of the disclosed wireless network system/s.

FIG. 1 shows one embodiment of the disclosed wireless LAN system/s having two mobile, wireless LANs ("WLANs"). Both WLANs operate in a master-slave (e.g., "star," "token ring," etc.) topology in that one node operates as the "base" and controls the operation of the WLAN and its distributed "remote" or "secondary" nodes. In the illustrated embodiment, one of the WLANs 100 is remote from the other WLAN 200. In this embodiment, both WLAN 100 and WLAN 200 have optional long range communication via links 110 and 308 between communication devices 109 and 207, and a receiving and transmitting device 301 at a remote office location 300. Communication between receiving and transmitting device 301 and WLANs 100 and 200 may occur using microwave, satellite, long range RF, cellular, or other suitable wireless transmission, although communication between receiving and transmitting device 301 and WLANs 100 and 200 may alternatively occur over wired conductor (e.g., phone line) as well. It should also be understood that the WLANs may operate in the same area by communicating on different channels, hop patterns, or frequency ranges.

WLAN 100 has illustrative nodes 101, 102, 103, 104, and 105 and a master node 106. Node 101 is shown as a vehicle or truck to illustrate a complex node with the ability to transport all its multiple elements within the WLAN. Such a vehicle may be, for example, a service truck used in the well servicing industry, delivery or maintenance trucks, railroad service vehicles, aircraft, or off-shore service vehicles.

Nodes 101–105 communicate with master node 106 via wireless communication links (illustrated as 107). In one embodiment of the disclosed system/s, the links 107 utilize frequency hopping spread-spectrum RF communications to transmit voice and data between the remote nodes 101–105 and the base node 106. The "hop" pattern is predetermined and known by the base and remote nodes. A number of "hop" patterns or "channels" may be provided in an area over which one or more WLANs may operate. In alternate embodiments, nodes communicate using direct sequence spread spectrum RF communications. The use of spread spectrum techniques reduces the vulnerability of a radio system to both interference from jammers and multipath fading by distributing the transmitted signal over a larger region of the frequency band than would otherwise be necessary to send the information.

In one embodiment of the disclosed WLAN system/s, nodes communicate using a communication band set-aside at 2.4 GHz. In most countries (including the U.S.), a portion of the RF spectrum has been set aside at 2.4 GHz for the purpose of allowing compliant spread spectrum systems to operate freely without the requirement of a site license. Because site licenses are not required, the presently disclosed wireless LANs have greater mobility in that the base and remote nodes may be relocated without any regulatory inconvenience.

It should be understood, however, that any suitable wireless communication scheme in an appropriate communication band may be used with the presently disclosed wireless LAN system/s. For example, nodes may communicate using a Time Division Multiple Access ("TDMA") scheme, Frequency Division Multiple Access ("FDMA") scheme, or any other known communications scheme.

In addition to mobility within a WLAN, node 101 may also travel from one WLAN to another WLAN. For example, FIG. 1 illustrates a node 108, which may also be a service or maintenance truck used in the well service industry, traveling between WLAN 100 and WLAN 200. Although the illustrated embodiment employs a service or maintenance truck as a node, the nodes of the disclosed WLAN system/s may be any device normally associated with or connected to a LAN. Further, although illustrated embodiments relate to the well service industry, the disclosed methods and apparatus may be useful for any industry requiring dynamic updating and configuring of a WLAN.

FIG. 1 also shows a node 206 arriving at WLAN 200 and establishing a wireless communication link 203 with a master 202. As illustrated, WLAN 200 includes a master node 202, which is communicating with several other nodes (201, 204, and 205). When node 206 enters the area covered by the WLAN 200, it initiates a registration procedure with a "master" or a "base" 202. Each node in the illustrated WLANs may have varying functional capability. Further, each node may be mobile within a WLAN, or to another WLAN. The master nodes 106 and 202 are illustrative of nodes that may serve to direct or coordinate communication between several other nodes, remote stations, or WLANs.

In operation, a WLAN may be assembled or modified based on the arrival of mobile nodes. For example, in one embodiment the first node to arrive has the ability to establish communications with another node when it arrives. One of the nodes becomes the master node. A master node is defined as the node that directs the communication between two or more nodes. The master node determines if an arriving node belongs to its WLAN. In addition, the master node receives and shares communications from a remote office location 300. In the illustrated embodiment, any node may optionally have the elements to enable it to become a master node, or alternatively the node may be directed or designated to become the master by the loading of appropriate software code. Thus the presently disclosed WLANs are dynamic entities made up of a number of nodes, the characteristics of which may change with time. Further, the number and characteristics of the nodes comprising a WLAN at any particular time may determine the tasks performed by the WLAN. For example, as described elsewhere herein, additional equipment may be required to meet particular job specifications and a system operator (e.g., field technician) or remote location informed of such requirement by the network, and/or the network may automatically call out or request directly for required new units to report to the jobsite. Alternatively, a network may revise the tasks to be performed by one or more individual units, and/or the nature of the entire job, based on the number and characteristics of the nodes comprising a WLAN.

It will also be understood with benefit of this disclosure that in one embodiment of the disclosed wireless network systems, two or more networks may be in signal communication (e.g., by wireless and/or hardwire communication) to cooperatively accomplish one or more operational tasks, such as a well treatment operation, and/or to perform two or more separate operational tasks simultaneously (related or unrelated). Examples of information that may be exchanged between two such networks include, but are not limited to, network information, network instructions, acquired data, etc. The relationship between any two or more networks may be defined, for example, as any of the master/slave node relationships described elsewhere herein for single network operations, with one network taking on the role of a master node, and one or more other networks taking on the role of slave nodes (or sub-networks).

The node targets communicate using a communication protocol that includes a number of commands, including a "Dump Data," a "Write to LAN," and a "Read from LAN" command. Under normal operation, communication is initiated by the base or master node. Depending upon the desired command, the base sends between three and eight bytes of data in succession for all of the nodes to hear. In an exemplary implementation of the communication protocol, the first byte is always an ASCII "ESCAPE" character (0x1Bh), which is transmitted to "wake up" the nodes and prepare them for additional bytes of data. The second byte of data is the unique LAN identification number ("ID") associated with the particular remote node with which the base desires to communicate. Under normal conditions, the ID for each remote node is unique so that only one node will respond to any base command. The third byte of data transmitted by the base represents the "command."

Specifically, the "Dump Data" command is represented by the ASCII "D" (0x44h). Therefore, an exemplary command from a node will be as follows: 0001 1011 (ESC), 0000 1100 (Remote LAN I.D.), 0100 0100 ("Dump Data" command). This command indicates to a remote node that it should send a predefined data string to the base. The length of the response data string is dependent upon the type of device that is addressed.

Similarly, a "Write to LAN" command is represented by the ASCII "R" (0x52h), which tells the remote node to write the value of a specific parameter address to the LAN (i.e., the base wants to READ data from the LAN). The byte following the "Write to LAN" command provides an address location of a predefined area of memory that holds parameters specific to that device. In this example, the address byte may address up to 256 parameters. The node responds by initially sending a four byte cluster signifying the start of data (e.g., 0, 0, 0, 1), followed by as many clusters as required for the response. Because the base requested the information, it should know the number and content of the data that it is attempting to read from the LAN.

In addition, the "Read from LAN" command is represented by the ASCII "W" (0x57h), which tells the addressed remote node to read a specified parameter from the LAN (i.e., the base wants to WRITE data to the LAN). The byte following the "Read from LAN" command provides an address location of a predefined area of memory that holds parameters specific to that node. The remaining bytes (bytes 5–8) will be four data bytes representing a floating point number (in binary) that the base device writes into a remote node's memory. For example, this command may be used to pass global information or node specific information to a remote node.

In an exemplary embodiment, the WLAN 100 may be configured with nodes that are operable to perform a well-fracturing function. In this application, the base 106 is a treating van, which is the van from which the job is monitored and controlled. The treating van communicates with "nodes," which would likely include pump trucks and other vehicles required for this particular function. For example, other nodes may include a "liquid additive module," "blender modules," or "gel pumps." When operating at a job site, a truck (or node), would register with the treating van when entering the coverage area of the WLAN.

In a well fracturing operation, pump trucks utilized typically have 1000 to 3000 horsepower for pumping gel fluid down a well at high flow rates and pressures. For particular applications, a number of pumping trucks may be piped together with other equipment to provide a gelled fluid that is displaced into a well at a rate and pressure sufficient to create a hydraulic fracture in a subterranean formation. Types and functions of such well servicing equipment are known to those of skill in the well servicing art. Once pumped into a well, the gel fluid breaks down, providing a path for the oil to be returned. As gel is being pumped into the well, proppant (e.g., sand) may be gradually added to the gel fluid to for placement in the hydraulic fracture. Sand is added using a sand blender truck, which is a truck that precisely controls the amount of sand blended with the gel fluid. Other trucks provide sand to the blender truck by conveyer belt. Each truck, or node, includes equipment for controlling and monitoring the process. For example, the blender truck must accurately monitor and control the amount of sand to be added to the gel fluid. These monitoring and control devices may be networked to the treating van via the presently disclosed WLAN system/s. Other nodes may include individual sensor and control devices. For example, the WLAN may include individual sensors at the well head for monitoring the density or pressure of the gel fluid entering the well.

Further, the treating van (acting as the base 106) may relay data back to a remote office location 300. In that manner, the remote office location 300 may monitor multiple sites and reallocate resources based on need at the various WLANs. For example, the remote location may determine that an additional pumping truck is located at a first node and could be reallocated to a second node. The remote location may then command the additional pumping truck to register at a second WLAN (as illustrated by node 108). In addition, the remote data transmission capabilities allows engineers or other personnel to monitor and control a job from a remote location. For example, job sites may be located off-shore or thousands of miles away. The remote data transmission capabilities of the disclosed WLANs eliminate the need for engineers or other specialists to travel to these remote sites.

Although one exemplary embodiment related to hydraulic fracturing has been described above, it will be understood with benefit of this disclosure that other well treatments and well services employing equipment known in the well servicing art may also be performed using embodiments of the disclosed WLAN. Such well treatments and services include, but are not limited to, treatment or services related to acidizing, condensate treatments, injectivity testing, gravel packing, frac packing, introduction of drilling fluids into a wellbore, etc. Other examples of well service operations (and/or related equipment) which may be advantageously performed and/or equipped using embodiments of the disclosed WLAN system include, but are not limited to, perforating operations, coiled tubing operations, drilling and workover rig operations, as well as any other type of well service operation employing one or more pieces of mobile equipment (including, but not limited to, equipment that is truck-mounted, trailer-mounted, skid-mounted, barge-mounted, etc.).

As previously described, trucks (or nodes) may "roam" from one WLAN to another WLAN. In one embodiment, trucks may leave a job site and return to a home base operation. For example, the home base may be located at a district office, maintenance yard, or field office. When a truck returns to its home base, the truck will register with the home base and "wake up" any equipment attached to the truck. The equipment may then provide information obtained from the sensors and control devices attached to the truck. In one embodiment, the information provided to the master at the home base may include material usage information (such as gas or gel fluid usage), truck maintenance reports (e.g., need for oil or gas in the truck), or other relevant information. Once the information has been dumped to the home base, the truck may be stored and any attached equipment may be placed in a "sleep" mode.

Figure 2:
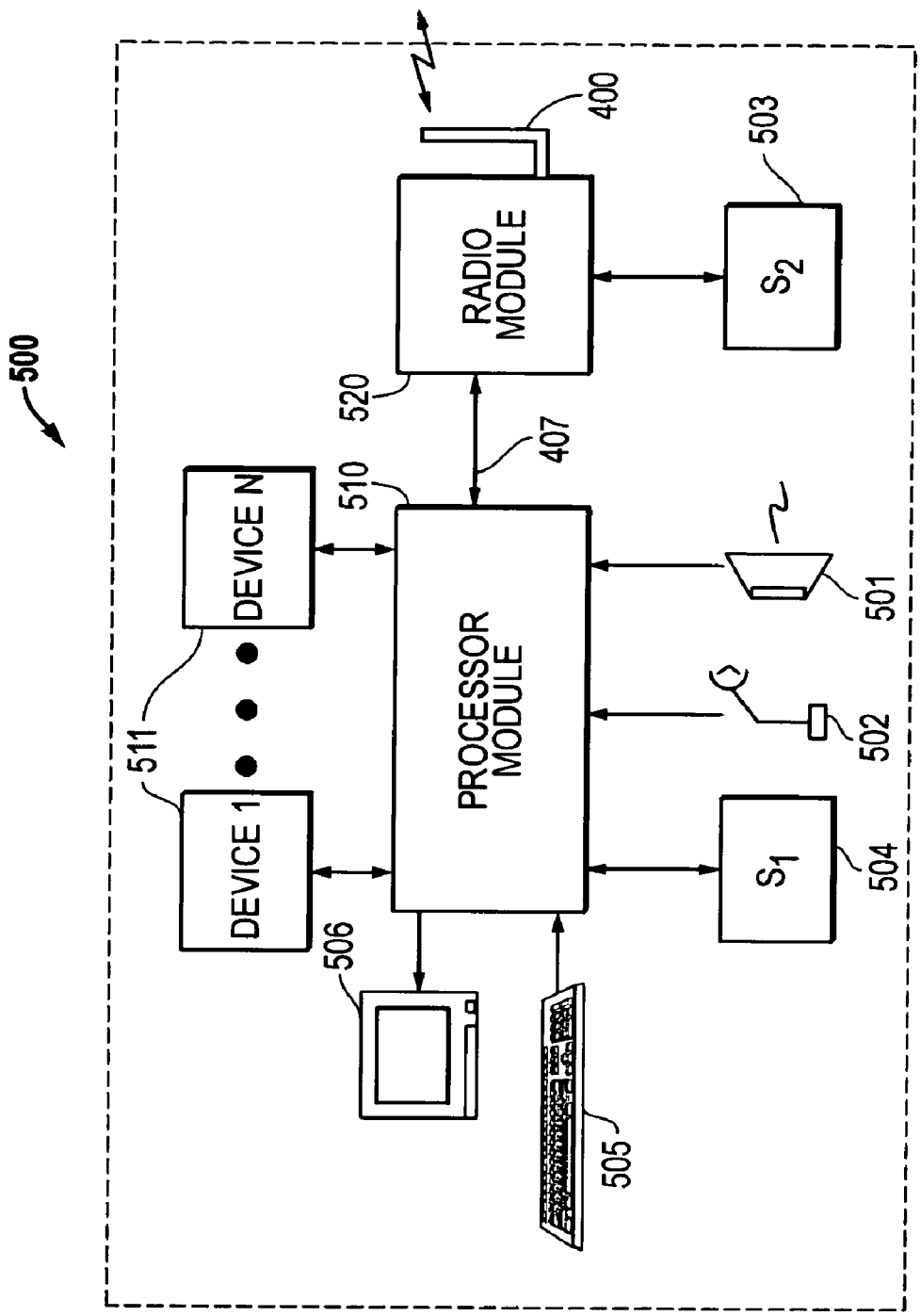
FIG. 2 illustrates an exemplary node with illustrative devices connected to the node according to one embodiment of the disclosed wireless network system/s.

FIG. 2 illustrates an exemplary embodiment of a node 500. As previously discussed, node 500 may be, for example, contained within a service or maintenance truck used in well-site operations. Node 500 includes two primary modules, a processor module 510 and a radio module 520. The radio module 520 includes a processor for executing a software protocol and controlling radio transmission among nodes. The processor module 510 controls operation of peripheral devices 511 and sensors 504 within a node. For example, peripheral devices 511 and sensors 504 may measure parameters, control valves, control a motor, or perform other functions required by the particular WLAN. Device 505 shows a manual input device that may be, for example, a keyboard, a keypad, or a voice recognition device that enables an operator to access a node. Device 506 illustrates a display that may provide visual feedback to an operator. For example, device 506 may display the output of a remote camera, a computer screen, or other such device. Device 502 illustrates a microphone for audio input, and device 501 shows a speaker for audio output. These devices may be used for voice communications between operators at various nodes or at a remote office location.

The processor module 510 may be, for example, a personal computer, a laptop computer, or any other processor-based computer equipment. The processor module interfaces to the radio module through interface 407. This interface may be an RS-232 interface, an RS-422 interface, or other suitable interface for connecting the processor module with the radio module. Although one processor module is illustrated connected to the radio module, it should be understood that additional processor modules may be connected to the radio module.

The radio module 520 includes a communication antenna 400 for communications between nodes. In one embodiment, one or more sensors 503 (e.g., density, flow rate, etc.) may be configured to operate directly with the radio module 520.

Just a few examples of devices that may be connected at a node are devices having input/output capability including, but not limited to, devices such as sensors, recorders, actuators, solenoids, audio microphones, speakers, display screens, processors, or the like. Other examples include, but are not limited to, devices such as controllable valves, pump controls, engine throttle actuators, measurement instruments, sensors (e.g., density, flow rate, pressure, temperature, viscometers, and pH sensors), or any other control or condition-sensing device known in the art for use in equipment, for example, employed in well servicing operations.

The node 500 may be powered by a power supply (not shown), which may be batteries, a generator, or other suitable device for powering node 500. For example, if node 500 were integrated as part of a service vehicle, node 500 may be powered from the vehicle's battery.

Figure 3:
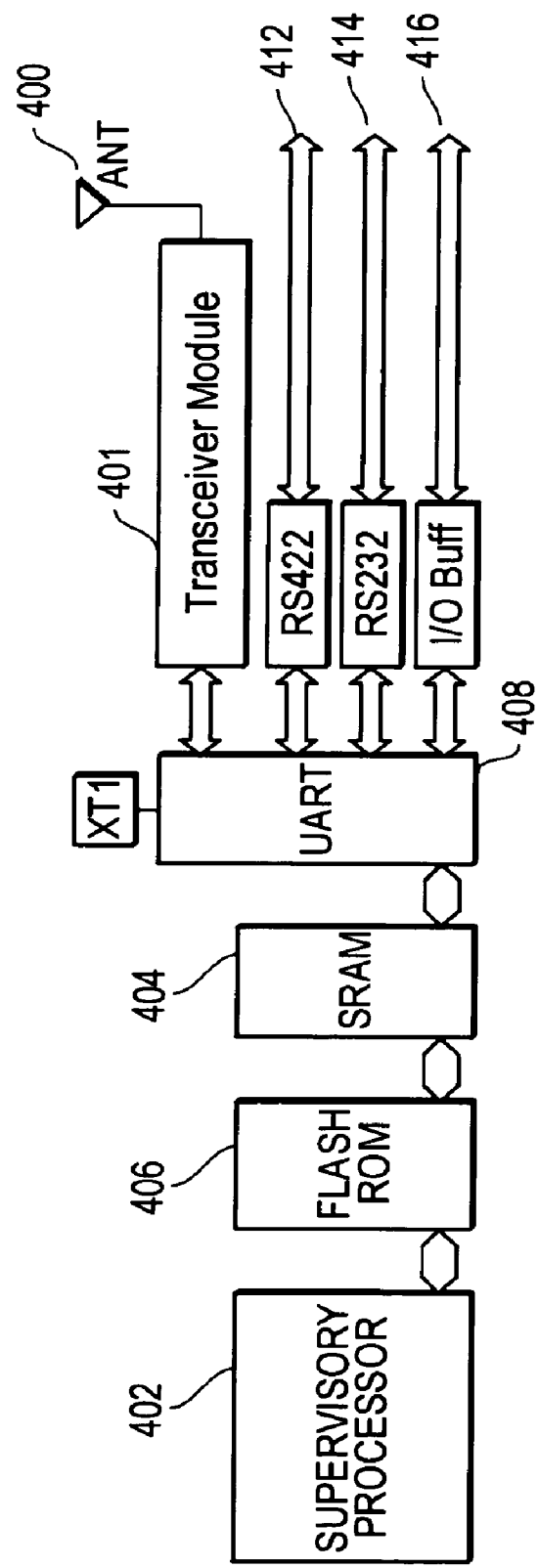
FIG. 3 is a detailed block diagram of an exemplary radio module according to one embodiment of the disclosed wireless network system/s.

FIG. 3 is a detailed block diagram of one embodiment of a radio module of the disclosed methods and apparatus. The illustrated embodiment includes an embedded supervisory processor 402, a transceiver 401 with an antenna 400, external memory 404, flash ROM 406, and UART 408. The radio module may interface to external devices through a variety of interfaces, including an RS-422 interface 412, RS-232 interface 414, or a standard I/O buffer 416.

Still referring to FIG. 3, transceiver module 401 may be a WIT2410 RF module, available from Digital Wireless Corp. The WIT2410 uses frequency-hopping spread-spectrum communication technology or TDMA technology to allow communication with other nodes. The WIT2410 operates in the 2400 to 2483 MHz frequency band and provides up to 75 frequency channels operating at channel data rates of 460 kbps. The WIT2410 module may operate as either a "remote" node or "base" node. In this exemplary embodiment, the transceiver 401 is connected to an antenna 400, which may be a fiberglass radome enclosed omni-directional antenna with a minimum 2 db gain over unity when operating as a remote or slave node, or an optional minimum 6 db or 9 db gain over unity when operating as a base node or master station. In one embodiment, the node is typically operable to communicate at least 1250 feet under all conditions.

The embedded processor 402 provides the primary function and control of the node 500 by retrieving and executing program instructions from flash ROM 406. In other embodiments, the program instructions may be contained in a ROM, EPROM, or other suitable storage device designed to store instruction code. The embedded processor 402 may be any suitable processing element, including, but not necessarily limited to, microprocessors or digital signal processors. In one embodiment, the processor 402 may be a Motorola MC68332-25 processor.

Node 500 may also include external memory 404. This memory may be connected to processor 402 and may store additional data or other program code for supervisory processor 402. In one embodiment, this memory is a RAM or SRAM, which permits the processor 402 to read and write to the memory.

Referring still to FIG. 3, blocks 412, 414, and 416 illustrate exemplary interfaces for other equipment (e.g., a processor module) to interface to the radio module. For example, interface 412 may be an interface to an existing hardwired LAN connector. For example, the interface may be a standard RS-422 transceiver. In this manner, the present radio module may be readily used with equipment presently interfaced with hardwired LANs without changing the hardware interface. Interface 414 may be an RS-232 interface for interfacing the radio module to external devices, such as lap-tops or desk-top computers, that use an RS-232 interface. The radio module may also include an I/O buffer interface 416 for interfacing to external devices. The I/O buffer interface 416 may be used, for example, to read external switch settings. Other applications that may be implemented using the I/O buffer interface include "waking-up" or "placing to sleep" external devices as previously described. Although illustrative and exemplary interfaces have been described, it will be understood with benefit of this disclosure that other interfaces known in the industry may be provided to interface the radio module to external equipment, and as many or as few of such interfaces as desired may be present.

In one embodiment, processor 402 of the radio module may perform the following functions within a node: process transceiver module network commands, format and buffer packets from the transceiver, perform handshaking, configure the mode of operation of the node within the network, control external peripherals and devices, and control LED status.

The processor 402 communicates with the transceiver 401 using packet communications with the following message types:

| TYPE | USED BY | FUNCTION |
| --- | --- | --- |
| DATA | base/remote | Carries user data |
| COMMAND | base/remote | Queries and commands to the radio |
| ACK | base/remote | Indicates success or failure transmitting a packet |
| CONNECT | base | Notification that a remote has joined the network |
| DISCONNECT | base | Notification that a remote has left the network |

In one embodiment, none of these packet types except the data packet are required for operation; command and framing packets are optional, and sequence numbers and ACK and CONNECT packets may be enabled or disabled through the Set Packet Mode configuration command. Some packet types may not be applicable for both base and remote radios. The following table illustrates the various packet modes available according to one embodiment of the presently disclosed wireless LAN system/s.

Set Packet Mode (sp--) command settings.
   00  transparent mode
   01  MRP mode 1, basic command and data only,
       no ACK or CONNECT/DISCONNECT packets, no sequence numbers
   02  MRP mode 2, with connection notification,
       adds CONNECT/DISCONNECT packets
   03  MRP mode 3, with connection notification and acknowledgment reports,
       adds CONNECT/DISCONNECT packets, sequence numbers and ACK packets
   04  WIT2400 protocol mode (for backwards compatibility with earlier versions of the RF module from Digital Wireless Corp.)

The byte formats for each packet type are shown in the tables below. Packet fields are organized to fall on byte boundaries. In the case of bit-level fields, most-significant bits are on the left.

WIT2400 packet type (packet mode 04)
DATA     0000 0010 00HH HHHH ALLL LLLL <0–127 bytes data> 0000 0011
WIT2410 packet types:
DATA (modes 1 and 2)    00HH HHHH ALLL LLLL <0–127 bytes data>
DATA (mode 3)    00HH HHHH 0000 SSSS ALLL LLLL <0–127 bytes data>
COMMAND    0101 1100   <4 byte command or 2 byte reply>
ACK    00HH HHHH 001X SSSS
CONNECT(base)    10HH HHHH RRRR TTTT 00NN NNNN <3 byte remote ID>
CONNECT(remote)    10HH HHHH RRRR TTTT 00NN NNNN <3 byte base ID>
DISCONNECT    10HH HHHH 0111 1111
   where:

|   |   |
|---|---|
| H | : handle number (0–63) |
| S | : sequence number (0–63) |
| A | : 0 = ARQ requested, 1 = no ARQ requested |
| L | : length (0–127) |
| X | : 0 = ACK, 1 = NAK |
| N | : network number |
| R | : receive sequence number (from previous LAN) |
| T | : transmit sequence number (from previous LAN) |
| P | : handle of destination remote |

Data Packet Format
Modes 01 and 02:  00HH HHHH ALLL LLLL  <0–127 bytes data>
Mode 03:          00HH HHHH 0000 SSSS  ALLL LLLL <0–127 bytes data>
Mode 04 (WIT2400): 0000 0010 XXHH HHHH  ALLL LLLL <0–127 bytes data>
                  0000 0011
where:
  H : handle number (0–63)
  S : sequence number (0–63)
  A : 0 = ARQ requested, 1 = no ARQ requested
  L : length (0–127)
  X : don't care (bits are ignored)

The data packet carries user data. The handle number is the handle of the sending or receiving remote, depending on whether the data is going to or coming from the base.

Up to 127 bytes of user data may be carried per data packet. For example, the data packet may be used to send the previously described LAN protocol used to communicate between various nodes.

The second byte of the data packet contains a sequence number and appears only if ACK/NAK reporting is enabled with the Set Protocol command. If enabled, this 4-bit sequence number is incremented each time a new packet is sent or received for the purpose of distinguishing between possible duplicate packets and also to identify which message an ACK is associated with. Duplicate packets are a rare circumstance and generally do not need to be checked for since they can only occur in networks with more than one base when a remote roams to a new LAN. Note that separate sequence numbers are maintained for incoming and outgoing data streams.

Handle 63 is reserved for broadcast packets from the base to all remotes. Acknowledgment requests are not supported for broadcasts. For this reason, it is a good idea to send broadcast messages several times to increase the odds of reaching all remotes.

Command Packet Format
Transmit:  0101 1100   <4 byte command>
Receive:   0101 1100   <2 byte result>

Command packets are intended to provide a means of accessing and configuring the radio command processor while still remaining "online." Command packets to the radio always contain four characters. If a given command has less than four characters, spaces should be used to pad the length to 4 characters. Replies from the radio are always two characters. Due to the way command packets are buffered, the user application must wait until the previous command has been replied to before sending a new one.

The radio can be configured to report several status events in the form of command packets. The formats for these are given below:

Carrier Detected
BIN: 0101 1100 0010 1101 0010 1101   HEX: 5C 2D 2D   ASCII: \--
Carrier Lost
BIN: 0101 1100 0010 1011 0010 1011   HEX: 5C 2B 2B   ASCII: \++
Signal Strength
BIN: 0101 1100 xxxx xxxx xxxx xxxx   HEX: 5C xx xx   ASCII: \xx (where x = 8-bit signal strength reading given as two ASCII hex digits)

The Carrier Detected and Carrier Lost status events apply to remotes only, and reflect the current state of the DCD signal. Signal Strength is a periodic report of received signal power, averaged over the last 10 hops.

ACK/NACK Packet Format (receive only)
00HH HHHH 001X SSSS (ACK: x=0 NAK: x=1)
  H      handle number (0–62)
  S      sequence number (0–63)
  X      0 = ACK, 1 = NAK An ACK report is issued to the user application upon confirmation from the receiving radio that the message was successfully delivered. If the number of attempts by the radio to send the message exceeds the limit programmed by the Set Transmit Attempts Limit command, a NAK will be issued. Since multiple packets may be buffered in the radio at a time, the transmit sequence number is used to identify the packet in question.

Connect Packet Format
  10HH HHHH RRRR TTTT 00NN NNNN <3-byte remote ID>
  (base, receive only)
    H : handle number (0–62)
    R : receive sequence number (from previous LAN)
    T : transmit sequence number (from previous LAN)
    N : network number of the previous base
  10HH HHHH RRRR TTTT 00NN NNNN <3-byte base ID>
  (remote, receive only)
    H : handle number (0–62)
    R : receive sequence number
    T : transmit sequence number
    N : network number of base Remotes must go through an automatic registration process when roaming from one base to another, after loss of contact, or when acquiring a base signal for the first time after power up. See FIG. 5. The base then assigns the remote a handle value, may or may not assign it a dedicated channel depending on the user settings, and notifies the user application of the new remote with a connect packet.

The network number of the last base the remote was connected to is given to aid user software in resending orphan packets that may have been improperly sent. If the remote has been powered up for the first time and this is the first base contacted, the last base ID will be reported as 0xFFh.

| Disconnect Packet Format (base only, receive only) |
|---|
| 10HH HHHH 0111 1111 |
| H                  handle number (1–62) |

When a remote goes out of range or roams to another LAN, the base issues a disconnect packet to indicate that the remote is no longer available.

Figure 4:
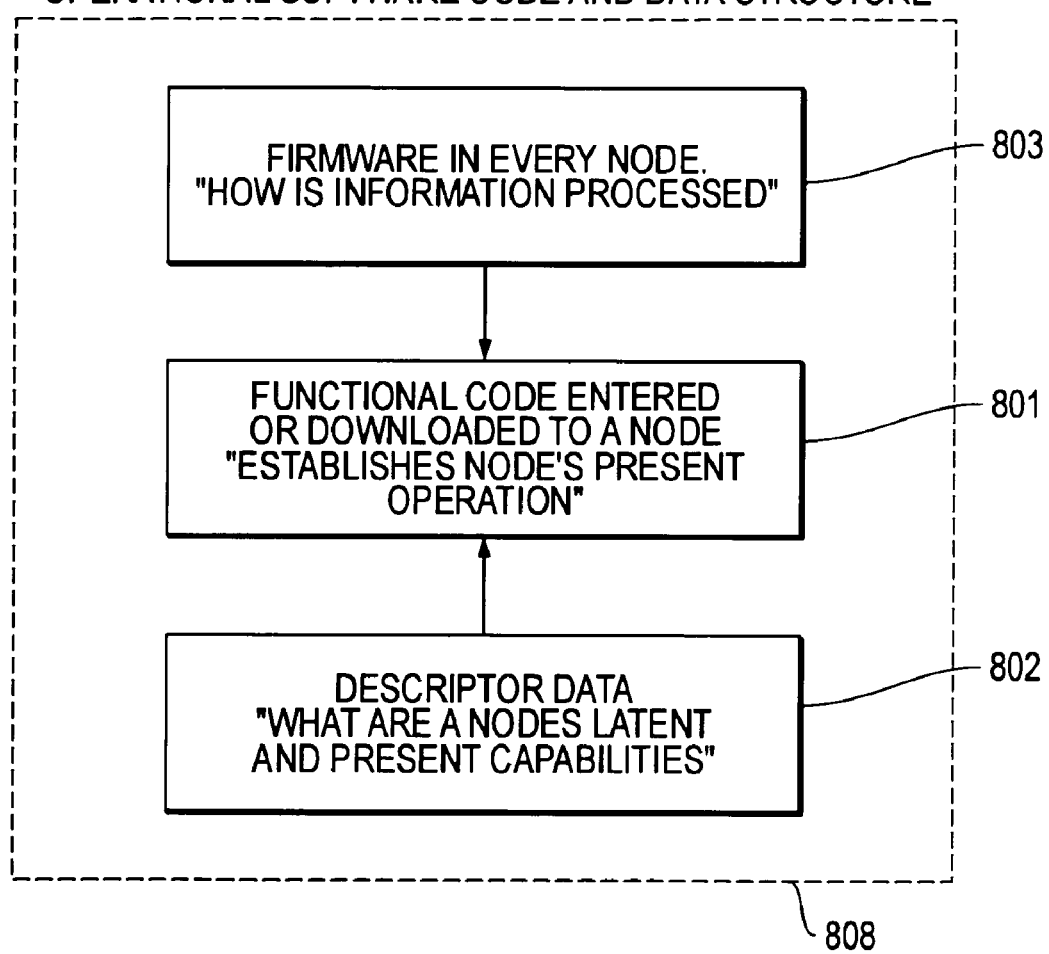
FIG. 4 shows a diagram of the software code and internal data structures of a radio module within a node according to one embodiment of the disclosed wireless network system/s.

FIG. 4 provides a high-level block diagram of one embodiment of the software components 808 that may be contained in a node. Firmware 803 is stored in flash memory 406 and performs the function of the operating system of the node—that is, it interprets the information coming into the node, loads and modifies functional software code 801, and stores descriptor data 802 for the node. In this embodiment, the functional code 801 establishes a node's present configuration. For example, once a module is registered at a site, the node will use a short address or "handle." The descriptor data 802 is a data structure within the node that describes the node's capabilities. When a node registers, the descriptor data 802 is communicated to the master or base to describe the functionality of the equipment at the remote node (e.g., the horsepower of a pump at the node, pump sizes, etc.). By providing separate functional code 801 and descriptor data 802, a node can be dynamically configured within a WLAN. In addition, this structure permits an entire network to be reconfigured without operator intervention when new devices are connected to the network.

Figure 5:
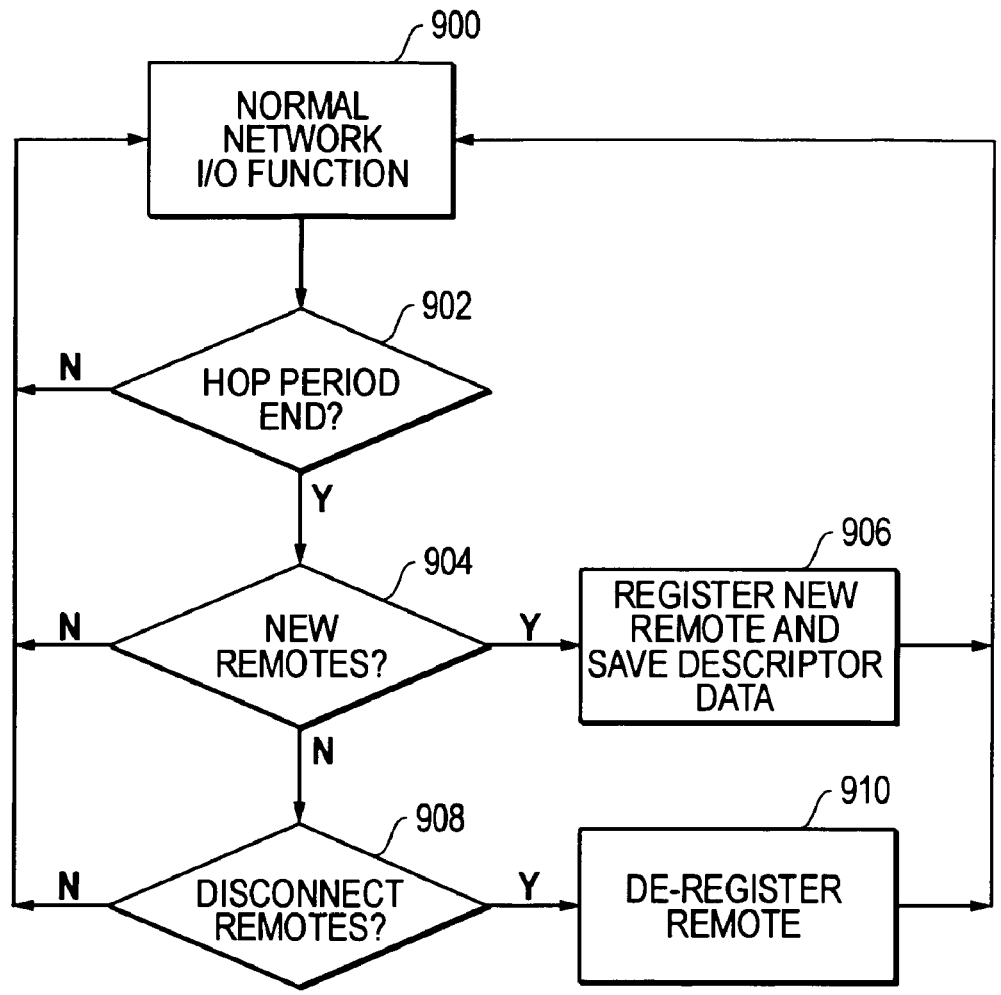
FIG. 5 is a flow chart that illustrates the synchronization and registration process of a mobile, wireless LAN according to one embodiment of the disclosed wireless network system/s.

FIG. 5 illustrates the synchronization and registration process for one embodiment of the disclosed WLAN system/s. In this exemplary embodiment, the nodes may be, for example, frequency hopping nodes that periodically change the frequency at which they transmit. Because the frequencies over which transmission occurs is changing, each node must be synchronized and set to the same hopping pattern. As previously discussed, one node in the WLAN may be designated or otherwise selected as the "master" or "base" station. All other nodes may be designated or otherwise selected as remotes. At block 900, the WLAN is operating in its normal network I/O function Each time the base station hops to a different frequency at the end of a hop period at block 902, the base immediately transmits a synchronizing signal to the remote nodes. Similarly, when a remote is powered on or enters a new WLAN at block 904, the remote rapidly scans the frequency band for the synchronizing signal from the base.

Upon synchronization, the remote must request registration from the base station. The registration process in block 906 involves the identification of the remote to the base by sending a node's descriptor data to the base. At block 908, the WLAN also tracks the remote nodes leaving the network. When a remote node leaves the network, the base de-registers the node at block 910. The base tracks remote nodes by building a table of serial numbers of registered remotes. As previously discussed, the WLAN may use "handles" to improve transmission efficiency. For example, a 24-bit remote serial number may be assigned a 6-bit handle. With 6-bit handles, each base may register up to 62 separate remotes (2 remotes are reserved for system use).

At the end of a task, a WLAN may execute a number of different options. For example, the WLAN may receive data from a master node that instructs it to reconfigure the network or to re-deploy nodes to another WLAN. In addition, the WLAN may send status or data to a remote location. In other applications, the entire WLAN may be requested to re-deploy to a new site, and re-establish wireless connection with existing or other nodes to begin another task.

In summary, the disclosed WLANs are dynamic, changing entities that are bound only by a commonality in communication method, ID structure, and software code. Nodes may be configured in an number of different ways for the disclosed WLAN. The communication method is wireless and one embodiment uses spread spectrum technology. Other communication technologies may be used within a WLAN that operates at the desired bandwidth and with the desired reliability. The instructions or data that makes up the microcode, functional software code, and the descriptor data may be the result of an application program operating on a computer system like a personal computer, a laptop computer, computer workstation, or other computer system. The WLANs in this disclosure are also envisioned to incorporate nodes constructed from, for example, single chip computers and single chip radio communication modules. These single chip computers and radio communication modules may be used to make nodes that are quite small and as such may have unique applications. Also envisioned in this disclosure are WLANs that are collections of maintenance, distribution, service or other vehicles in a given communication area assembled as nodes to do a task where, for example, that task may change or need to be modified based on downloaded data, acquired data, or operator entered information.

EXAMPLES

The following example is illustrative and should not be construed as limiting the scope of the invention or claims thereof.

Example 1

Spread Spectrum Wireless Network for Well Treating Application

This example describes a possible exemplary embodiment of the disclosed wireless network system/s as it might be configured for well treating applications, and consisting of a supervisory embedded processor, an OEM RF module, harsh environment packaging and appropriate communications protocol.

A. System

In this exemplary embodiment, the network is considered a master-slave topology, rather than a peer to peer statistical collision based scheme. Specifically, one device is the system master and all other distributed points are a slave. The software of the system is designed to operate in a transparent mode, that is the target data passes through without characters added or dropped. Timing should be unaltered within the limitations of spread spectrum technology.

B. Job site operation

As vehicles arrive at a job site (radio power always on) the master and slave exchange information and declare each other's presence. At this point normal LAN operations may commence. Several masters may operate in the same area but on different hop patterns (channels).

Manual Network Input Embodiment: Master Control has a database that associates individual slave node identity characteristics (node identity code) with node functionality of the equipment associated with each node. Human operator present at each slave node enters node identity code on a key pad and the code is transmitted from the individual slave node to the Master Control node, where it is associated with node functionality using the database. Field technician or network supervisor sets a network computer connected to the master to monitor each identified node in the network as appropriate.

Automatic Network Input Embodiment: Individual slave nodes automatically transmit identification codes to Master Control without manual input. Transmission may automatically initiated by Master Control node or alternatively automatically initiated by individual slave nodes. Alternatively, node functionality information may be transmitted by individual slave nodes to Master Control node in addition to, or as an alternative to, slave node identification codes.

C. Roaming

When a well treatment vehicle is out of the radio area it is in the roam mode. Vehicles may move from one district (e.g., selected geographical area) to another in the roam mode. The hop pattern is constantly rotating through numerous pre-assigned "channels" of interest.

D. Home base operation

The well treatment vehicle may roam into any operational network. This includes a WLAN that is operational at a central office, maintenance yard or field office. The WLAN will "wake up" its attached host if not currently energized and initiate special home base functions. Such functions may include retrieval of acquired data (e.g., well treatment information, vehicle engine operation data, well treatment material or fuel usage, or vehicle/equipment maintenance information, etc.). The WLAN may then put the host system back to "sleep" as the vehicle is stored.

E. RF Module Specifications

WIT2410 Specifications

GENERAL SPECIFICATIONS

| | | | | | |
|---|---|---|---|---|---|
| RF FREQUENCY | 2400 to 2483 MHz | | | | |
| Radio Certification | FCC Part 15.247, ETS 300-328 and RSS210 rules, license free | | | | |
| Operating Range | Indoor: 450° to 900° Outdoor: 3000° with dipole antenna, >20 miles with gain antenna | | | | |
| Network Topology | Star network | | | | |
| Network Protocol | CSMA/CA or TDMA | | | | |
| Error Detection and Correction | 24 bit CRC and ARQ | | | | |
| Serial Data Interface | Asynchronous (RS-232) CMOS signals, 3.3 v; 5 v tolerant | | | | |
| I/O Data Rate | Up to 115.2 Kbps, software selectable | | | | |
| Channel Data Rate | 460 Kbps | | | | |
| # of Frequency Channels | 75 | | | | |
| RF Bandwidth | 750 KHz | | | | |
| Transmit Power Output | 10 mW or 100 mW, software selectable | | | | |
| Receiver Sensitivity | −93 dBm | | | | |
| Supply voltage | 3.3 v to 10 v, 5 v nominal | | | | |
| Current Consumption (100 mW Transmit Power, 115.2 Kbps I/O) | Remote Operation | Sleep <50 mA Stby 12 mA Typical 50 mA Peak (Tx) 200 mA | Base Operation | Typical Peak (Tx) | 120 mA 200 mA |
| Size | 80 mm x 47 mm x 9 mm | | | | |
| Weight | 43 g | | | | |
| Operating Temperature | −40° C. to 70° C. | | | | |
| Humidity | 20% to 90% (non-condensing) | | | | |

F. Other Node Equipment Specifications:

Node equipment designed to operate in extremely harsh environments with immunity from interference and may be configured in the field as a RS232 direct link or as a distributed base/remote LAN device. A unified connector routes power, data and one output driver. The antenna support mast is solid fiberglass and can adapt to several configurations.

| | |
|---|---|
| Serial Channels: | 1 General purpose RS232 2400,9600,19200,38400 baud 1 BJ LAN RS422(base or remote) 38400 baud |
| Power: | 9–32 Vdc 3 Watts maximum input power. LED multi-state indicator |
| Temperature: | −40 C. to 70 C. operating, −50 C. to 85 C. storage |
| Software: | Compatible with JobMaster, Isoplex36 and 3600 etc. |
| Configuration: | Self-contained configuration program. Operates with any terminal. |
| RE: | Transmitter 100 mw ERP, Frequency hopping Spread Spectrum 2.4–2.5 GHz, Rx −93 dBm, Range 1000'. [300 meters] Certified license free FCC Part 15.247 and ETSI. FCC ID HSW-2410M |

G. Antenna

In this exemplary embodiment, an antenna may be employed having a minimum 2 dbi gain over unity for slave nodes and optionally 6 db or 9 db if a master station. Wind loading without damage is 120 mph minimum. The radiation pattern is omni-directional and a ground plane is enclosed within the package.

H. Range Requirement and Interference

A minimum outdoors line-of-sight operation is 1000' (300 m) under all conditions. This includes operating in or near rain, lightening, adjacent UHF/VHF radios, microwave ovens and direct sequence modulation Ethernet PC networks. Maximum data throughput degradation for this embodiment is 20% under any conditions.

The module may operate in 100 mw or 10 mw power level by either software command or auxiliary discrete input signal. This allows operation in environments that are sensitive to RF energy. Section 3.3 range requirements do not apply in low power mode. The FCC Identifier is HSW-WIT2410M.

I. Supervisory Embedded Processor

The RF module communicates with a local supervisor embedded processor that performs the following functions.

RF module commands

Software and hardware handshaking/buffering

Mode configuration, point to point and special applications

External auxiliary control, external device "wake-up"

LED status indicator

J. RF Module Control Syntax

The base application (JobMaster or 3600) transmits to all remote nodes simultaneously and receives from a single responding remote. (I.e. MCM1000).

K. Buffering

The supervisory processor buffers and formats communications strings as required by the RF module. Each circular input and output buffer is minimum 256 bytes.

L. Handshaking

System components support both legacy systems with no handshake whatsoever and newer systems that have allowed XON/XOFF.

M. Data Rates

Wireless network communications channel operates at 38.4 kbps and the RF module operates at 38.4 k bps. The DB9/RS-232 channel is programmable to operate from 2400 bps to 38.4 k bps and may use hardware or software handshaking.

N. Operating Modes

Node system component may be used in special applications such as a single point to point link when not in the standard LAN mode. Configuration is made through the DB-9/RS-232 port using a resident configurator program "Congo".

O. Production programming

Production and field updates to software can be made through the DB-9/RS232 port. Software is also serviceable via the BDM connector located on the processor PCB.

P. Power Supply

DC Input power voltage is 9–36 vdc with 15% ripple maximum. Node component driver and RS-232 port have an isolated supply. Total power dissipation is 3 watts maximum.

Q. Packaging and Environmental

The packaging is NEMA 4X sealed and all components are capable of operating at −40° C. to +70° C. Storage is −50° C. to 85° C.

R. CPU and Communication Interfaces

The module has a minimum of 256 k 16 bit Flash ROM and 64 k byte static ram. The CPU is a Motorola MC68332-25. The processor has a Vcc/watchdog reset and ram battery controller. One output for the control of an external device is included. Output current is 750 ma continuous. A four channel buffered UART serves the node, RF module and RS-232 port.

S. Status Display

A multi-mode blink rate ultra-bright LED indicates operating status.

T. Supervisory Processor Block Diagram

Figure 6:
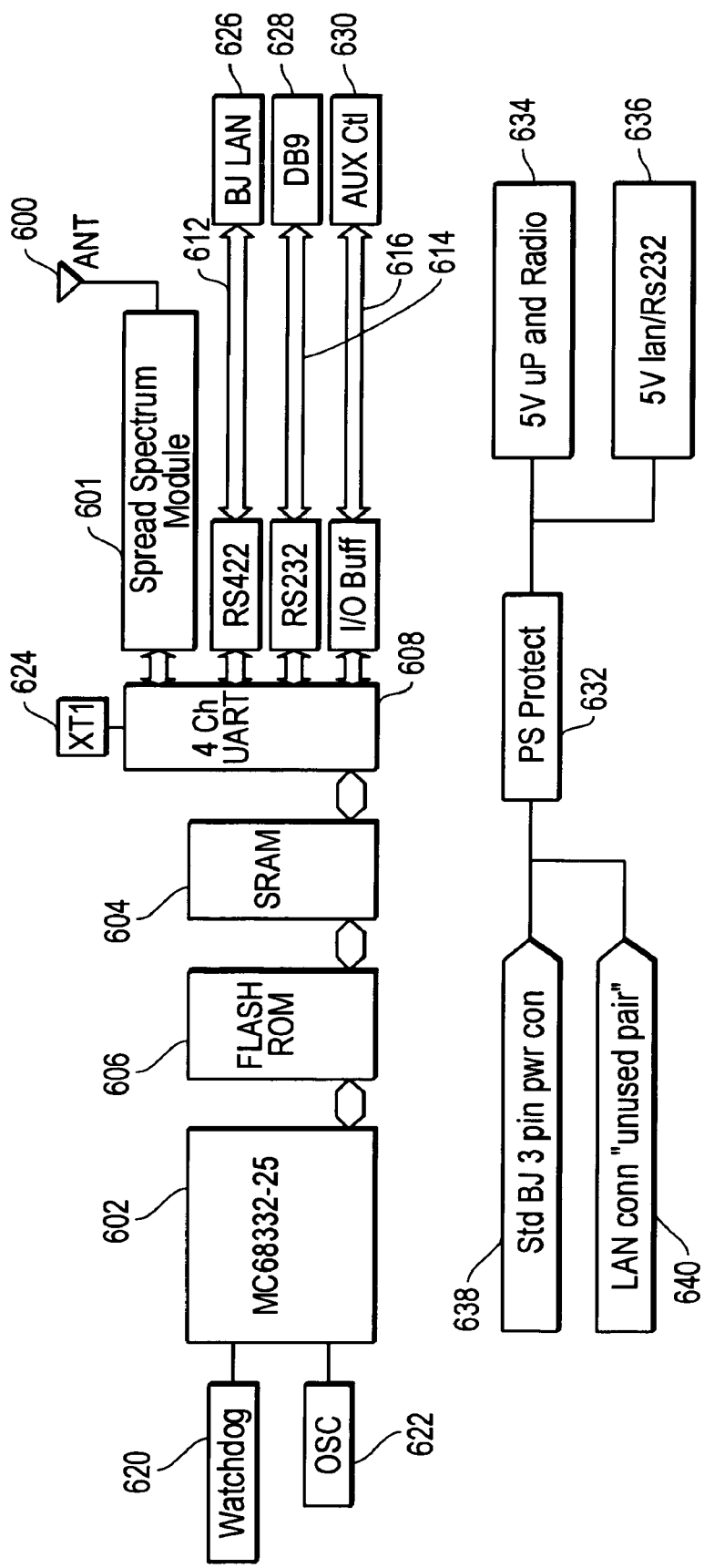
FIG. 6 is a supervisory processor block diagram corresponding to the exemplary embodiment of Example 1.

A supervisory processor block diagram for this example is shown in FIG. 6. FIG. 6 shows an embedded Motorola MC68332-25 supervisory processor 602, a WIT2410 RF module transceiver 601 with an antenna 600, external memory 604, flash ROM 606, and UART 608. A watchdog timer 620, oscillator 622, and crystal oscillator 624 are also shown. The radio module may interface to external devices through a variety of interfaces, including an RS-422 interface 612, RS-232 interface 614, or a standard I/O buffer 616. FIG. 6 shows connection to BJ LAN 626, DB9 connector 628, and auxiliary control 630. Also shown in FIG. 6 are power supply protect 632, unused LAN connectors 640, 5V power supply for CPU and radio module 634, and 5V power supply for the LAN and serial port transceivers 636.

Example 2

Wireless Network Used in Fracture Stimulation Mode

This example describes a possible exemplary embodiment of wireless network as it might be configured and uses for a fracture stimulation well treatment. Such an embodiment might also be employed for other stimulation treatments, such as acid treatments.

A. Topology and Operation

A central control vehicle contains several monitoring/control computers. Two separate wireless networks are operating on different hop patterns (channels). Wireless network I consists of a central control computer, a hydration unit, and a chemical additive unit, a wellhead monitor unit, a blending unit and a laboratory van. A central control computer may be, for example, imbedded processor-based "ISOPLEX" system operated by BJ Services or alternatively a PC-based system. Wireless network II consists of a pump control computer (e.g., computer terminal denoted as "FracMan" where operator may control all pumps) and a various number of high pressure pumping units as required for an individual well treatment. The FracMan computer monitors telemetry from the pumping equipment, e.g., pressures, pump rate displacement, etc. Engine control circuitry may be optionally connected via wire with the pump control computer (e.g., FracMan).

The network I and network II central control computers are each capable of operating in a stand-alone mode. They may or may not pass data between each other, as desired for a given well treatment operation. In one configuration, Network I treats Network II as a slave node. All units/nodes have a spread spectrum wireless system attached, for example as described in Example 1. In the case of required radio silence (i.e., during wellsite operations with explosives), a conventional wired LAN may be substituted for the radio sets. In this regard, some operations merely shut down and observe radio silence only during a brief time while explosives are processed.

A well treating specialist or petroleum engineer may supervise job operation. Job design changes (i.e., pressure, density, volumes and flow rates, leak-off information, etc.) may dynamically be altered from the original intended fracturing plan based on discovered well characteristics during the treatment (e.g., flow rates and treating pressures, injectivity, etc.).

B. Network I Operation

The Network I central computer first verifies that all anticipated slave units are available and working. The input flow rate is acquired from a blending unit node and rebroadcast to all slave nodes. The chemical additive and hydration unit node uses this data to adjust injected chemical rates. The blending unit node may optionally use this rebroadcast flow rate to use as its base to adjust proppant ratios. The central computer acquires from all units a full complement of operating real time data (e.g., fluid viscosity, chemical flow rates, low pressure density, high-pressure density, fluid temperature, input and discharge flow rates and cumulative totals). The central control computer may also change the flow meter pulse constant (or "K factor") of any slave node.

C. Network II Operation

Network II is connected to all high-pressure pumps and optionally to network I central computer. The engine throttle and transmission gear of an individual pump unit may be controlled in real time by a skilled operator, or optionally by computer control such as using FracMan to monitor actual treatment conformance with job plan (e.g., rates, number of working pump units, pressures, etc.) and to adjust pumping conditions accordingly. All parameters are monitored including estimated flow rate based on pump speed, engine diagnostic data, drive train vibration and discharge pressure. The network II central computer may declare an overpressure emergency shutdown at which time an emergency stop command ("E-STOP") is broadcast to all units.

D. Post Job Operations

Upon returning to the field district's office, job data may be automatically (without operator intervention) downloaded to, for example, a Company Intranet (e.g., TCPIP, Windows based intranet, etc.) via a wireless node in the motor yard. This information is used for post job engineering analysis (e.g., job or treatment reports, etc.), accounting/billing purposes (e.g., chemical and material inventory control, billing for chemicals and materials, off-road fuel consumption calculations, invoicing, etc.), and preventive maintenance.

Example 3

Wireless Network Used in Coiled Tubing Operation Mode

This example describes a possible exemplary embodiment of wireless network as it might be configured and uses for coiled tubing operations.

Telemetry from a coiled tubing unit (e.g., tubing depth, tubing movement direction, draw weight, pressure, etc.) may be monitored from a remote point, for example, located on a control barge in a coastal marsh canal or in offshore waters. Monitoring functions may be provided by the disclosed wireless network systems utilizing slave nodes on the coiled tubing unit and a master node on the control barge, with a human operator or otherwise in a fashion described elsewhere herein. In this exemplary embodiment, the CTU (coiled tubing unit) is advantageously on a different non-adjacent barge from the control barge. As shown by this example, this embodiment of the disclosed wireless network system allows grouped vessels to communicate reliability, allows supervisory personnel to monitor/control equipment from a location remote to the well (e.g., enhancing safety, convenience, and/or barge space optimization), and under conditions where using hardwired connections is extremely difficult (or impossible) due to moving or floating platforms.

Example 4

Wireless Network Used in Cementing Operation Mode

This example describes a possible exemplary embodiment of wireless network as it might be configured and uses for cementing operations.

In one embodiment, a cement skid is used to perform cementing operations which are required to be monitored in real time by, for example, a customer representative of a well treating service company's customer. This person may not be essential to the job operations, but nonetheless needs to monitor cementing conditions (e.g., fluid density, flow rates, pressures, etc.) and/or provide input on the performance of the treatment. Advantageously, use of the disclosed wireless network systems allows remote data acquisition by such a person from a safe area (e.g., 1000' away), for example, in a pickup truck, van, etc. with a laptop computer that operates as a node to the disclosed wireless network system.

As may be seen from the preceding examples, the disclosed wireless network systems may be advantageously employed for remote monitoring/control, under conditions where running hardwire cabling over long distances to remove monitoring/control personnel from the wellsite is not practical and/or economical.

Telemetry from a coiled tubing unit (e.g., tubing depth, tubing movement direction, draw weight, pressure, etc.) may be monitored from a remote point, for example, located on a control barge in a coastal marsh canal or in offshore waters. Monitoring functions may be provided by the disclosed wireless network systems utilizing slave nodes on the coiled tubing unit and a master node on the control barge, with a human operator or otherwise in a fashion described elsewhere herein. In this exemplary embodiment, the CTU (coiled tubing unit) is advantageously on a different non-adjacent barge from the control barge. As shown by this example, this embodiment of the disclosed wireless network system allows grouped vessels to communicate reliability, allows supervisory personnel to monitor/control equipment from a location remote to the well (e.g., enhancing safety, convenience, and/or barge space optimization), and under conditions where using hardwired connections is extremely difficult (or impossible) due to moving or floating platforms.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the apparatus may be utilized in various combinations and/or independently. Thus the invention is not limited to only those combinations shown herein, but rather may include other combinations.

What is claimed is:

1. A wireless network, comprising:
    at least two nodes in wireless communication with each other, each of said nodes having at least one of an individual node functionality characteristic or an individual node identity characteristic;
    wherein at least a first node of said two or more nodes is capable of transmitting at least one of its individual node functionality characteristic or its individual node identity characteristic to at least a second node of said two or more nodes; and
    wherein said second node is capable of establishing or modifying a network functionality of said wireless network based on respective node functionality characteristics of said first and second nodes, respective node identity characteristics of said first and second nodes, or a combination thereof; and wherein said first node comprises at least one piece of well treating or well servicing equipment operable to perform at least one well treating or well servicing action; and wherein said second node is configured as a master node capable of controlling said first node using said wireless communication by directing said at least one piece of well treating or well servicing equipment to perform said at least one well treating or well servicing action.

2. The wireless network of claim 1, wherein said second node is capable of transmitting information at least partially defining said network functionality to said first node.

3. The wireless network of claim 1, wherein said second node is capable of establishing or modifying a network functionality of said wireless network based on human input or control.

4. The wireless network of claim 1, wherein said second node is capable of establishing or modifying a network functionality of said wireless network automatically without human input or control.

5. The wireless network of claim 1, wherein said wireless network is capable of accepting additional nodes into said wireless network as said additional nodes come into communication with said second node, and wherein said wireless network is capable of releasing existing nodes that terminate communication with said second node, each of said additional or existing nodes having at least one of an individual node functionality characteristic or an individual node identity characteristic and being capable of transmitting at least one of its individual node functionality characteristic or its individual node identity characteristic to at least said second node; and wherein said second node is capable of modifying an established functionality of said wireless network based the addition of at least one of respective node functionality characteristics or respective node identity characteristics of said additional node, on the deletion of at least one of respective node functionality characteristics or respective node identity characteristics of said exiting node, or a combination thereof.

6. The wireless network of claim 5, wherein said second node is capable of modifying an established network functionality of said wireless network based on at least one of respective node functionality characteristics of each node communicating in said wireless network or respective node identity characteristics of each node communicating in said wireless network, and on total number of nodes communicating in said wireless network.

7. The wireless network of claim 1, wherein said second node is in signal communication with a remote location; wherein said second node is capable of transmitting network data to said remote location, said network data comprising node functionality characteristics, node identity characteristics, data acquired by one or more of said nodes, or a combination thereof; and wherein said remote location is capable of transmitting network instructions to said second node to modify a network functionality of said wireless network, modify the node functionality of one or more of said nodes, or a combination thereof.

8. The wireless network of claim 1, wherein each of said first node and said second node comprises a vehicle capable of assembling with other vehicles at a wellsite.

9. The wireless network of claim 1, wherein at least one of said first and second nodes is dynamically configurable within said network.

10. A mobile wireless network for conducting well treatment or well servicing operations, comprising:

at least two nodes in wireless communication with each other, each of said nodes having at least one of an individual node functionality characteristic or an individual node identity characteristic;

wherein at least a first node of said at least two nodes is capable of transmitting at least one of its individual node functionality characteristic or its individual node identity characteristic to at least a second node of said at least two nodes;

wherein each of said at least two nodes are mobile nodes coupled to well treating or well servicing equipment capable of assembling at a wellsite to perform a well treatment or well servicing operation;

wherein each of said at least two nodes comprises a roaming radio transceiver; and wherein each of said first node and said second node comprises a vehicle capable of assembling with other vehicles at a wellsite to perform said well treatment or well servicing operation.

11. The wireless network of claim 10, wherein said second node is capable of establishing or modifying a network functionality of said wireless network based on respective node functionality characteristics of said first and second nodes, respective node identity characteristics of said first and second nodes, or a combination thereof; and wherein said second node is capable of transmitting information at least partially defining said network functionality to said first node.

12. The wireless network of claim 10, wherein said second node is capable of establishing or modifying a network functionality of said wireless network based on respective node functionality characteristics of said first and second nodes, respective node identity characteristics of said first and second nodes, or a combination thereof; and wherein said second node is capable of establishing or modifying a network functionality of said wireless network based on human input or control, automatically without human input or control, or a combination thereof.

13. The wireless network of claim 12, wherein said wireless network is capable of accepting additional nodes into said wireless network as said additional nodes come into communication with said second node, and wherein said wireless network is capable of releasing existing nodes that terminate communication with said second node, each of said additional or existing nodes having at least one of an individual node functionality characteristic or an individual node identity characteristic and being capable of transmitting at least one of its individual node functionality characteristic or its individual node identity characteristic to at least said second node; and wherein said second node is capable of modifying an established functionality of said wireless network based the addition of at least one of respective node functionality characteristics or respective node identity characteristics of said additional node, on the deletion of at least one of respective node functionality characteristics or respective node identity characteristics of said exiting node, or a combination thereof.

14. The wireless network of claim 13, wherein said second node is capable of modifying an established network functionality of said wireless network based on at least one of respective node functionality characteristics of each node communicating in said wireless network or respective node identity characteristics of each node communicating in said wireless network, and on total number of nodes communicating in said wireless network.

15. The wireless network of claim 12, wherein said second node is in signal communication with a remote location; wherein said second node is capable of transmitting network data to said remote location, said network data comprising node functionality characteristics, node identity characteristics, data acquired by one or more of said nodes, or a combination thereof; and wherein said remote location is capable of transmitting network instructions to said second node to modify a network functionality of said wireless network, modify the node functionality of one or more of said nodes, or a combination thereof.

16. The wireless network of claim 12, wherein said node functionality characteristics comprise well treatment or well servicing operation equipment type, well treatment or well servicing operation equipment characteristics, or a combination thereof;

wherein said node identity characteristics comprise an identity code; and wherein said network functionality comprises at least one network algorithm related to a well treatment or well servicing operation.

17. The wireless network of claim 12, further comprising at least one third node in wireless communication with said first and second nodes, wherein said first and third nodes are capable of exchanging directly between each other at least one of network information, network instructions, acquired data, or a combination thereof.

18. The wireless network of claim 10, wherein said second node is capable of establishing or modifying a network functionality of said wireless network based on respective node functionality characteristics of said first and second nodes, respective node identity characteristics of said first and second nodes, or a combination thereof; wherein each of said nodes are mobile nodes, and wherein said wireless network is a mobile wireless network.

19. The wireless network of claim 18, wherein said nodes are in communication via spread spectrum radio frequency.

20. The wireless network of claim 19, wherein said nodes are in communication via frequency hopping spread spectrum radio frequency.

21. The wireless network of claim 10, wherein said well treatment or well servicing operation comprises at least one of a well stimulation operation, a well cementing operation, a coiled tubing operation, a sand control operation, or a combination thereof.

22. The wireless network of claim 10, wherein at least one of said first and second nodes is dynamically configurable within said network.

23. The wireless network of claim 22, wherein said first node is coupled to at least one piece of well treating or well servicing equipment operable to perform at least one well treating or well servicing action; and wherein said second node is dynamically configurable to become a designated master node capable of controlling said first node using said wireless communication to direct said at least one piece of well treating or well servicing equipment to perform said at least one well treating or well servicing action.

24. A mobile wireless network for conducting well treatment or well servicing operations, comprising:

at least two nodes in wireless communication with each other, each of said nodes having at least one of an individual node functionality characteristic or an individual node identity characteristic;

wherein at least a first node of said at least two nodes is capable of transmitting at least one of its individual node functionality characteristic or its individual node identity characteristic to at least a second node of said at least two nodes;

wherein each of said at least two nodes are mobile nodes coupled to well treating or well servicing equipment capable of assembling at a wellsite to perform a well treatment or well servicing operation;

wherein each of said at least two nodes comprises a roaming radio transceiver; and wherein one or more of said secondary nodes comprises a data storage device, said data storage device capable of containing acquired data; and wherein said secondary node comprising said data storage device is capable of automatically downloading said acquired data to another secondary node, master node or remote location when said secondary node comprising said data storage device comes into signal proximity with said another secondary node, master node or remote location.

25. A mobile wireless network, comprising:

a plurality of mobile secondary nodes in wireless communication with each other and a mobile master node, each of said secondary nodes having at least one of an individual node functionality characteristic or an individual node identity characteristic;

wherein each of said secondary nodes is capable of transmitting at least one of its individual node functionality characteristic or its individual node identity characteristic to said master node;

wherein said master node is capable of establishing a network functionality of said wireless network based on at least one of said respective secondary node functionality characteristics, said respective secondary node identity characteristics, and the number of said secondary nodes communicating in said wireless network;

wherein said master node is capable of accepting additional secondary nodes into said wireless network as said additional nodes enter into communication with said master node, and wherein said master node is capable of releasing existing nodes that terminate communication with said master node, wherein said accepting comprises modifying said established network functionality of said wireless network based on the addition of at least one of respective node functionality characteristics, respective node identity characteristics of each additional node, and revised number of secondary nodes communicating in said wireless network, and wherein said releasing comprises modifying said established functionality based on the deletion of at least one of respective node functionality characteristics, respective node identity characteristics of said exiting node and revised number of secondary nodes communicating in said wireless network; and wherein said each of said secondary nodes is in signal communication with one or more sensing or control devices coupled to mobile well treating or well servicing equipment and operable to monitor well treatment or well servicing operation conditions, control well treatment or well servicing operation control parameters, or a combination thereof.

26. The wireless network of claim 25, wherein said master node is in signal communication with a remote location via long range communication link; wherein said master node is capable of transmitting network data to said remote location, said network data comprising node functionality characteristics, node identity characteristics, data acquired by one or more of said nodes, or a combination thereof; and wherein said remote location is capable of transmitting network instructions to said master node to modify a network functionality of said wireless network, modify the node functionality of one or more of said nodes, or a combination thereof.

27. The wireless network of claim 26, wherein said node functionality characteristics comprise equipment type, equipment characteristics, or a combination thereof;
wherein said node identity characteristics comprise an identity code; and wherein said network functionality comprises at least one network algorithm related to a well treatment or well servicing operation.

28. The wireless network of claim 26, wherein said remote location is capable of transmitting network instructions to said master node directing one or more of said nodes of said wireless network to redeploy to a new location, combine with other nodes to form a different wireless network, or a combination thereof; and wherein said master node is capable of transmitting at least a portion of said network instructions to one or more of said secondary nodes.

29. The wireless network of claim 28, wherein each of said nodes comprises a radio transceiver, and wherein said nodes are in communication with each other via frequency-hopping spread spectrum radio transmission.

30. A method of performing an operational task with at least two mobile units, comprising:
assembling said at least two mobile units at a task location; and
performing said operational task;
wherein said at least two mobile units operate as nodes in a mobile wireless network;
wherein said at least two nodes are in wireless communication with each other, each of said nodes having at least one of an individual node functionality characteristic or an individual node identity characteristic;
wherein at least a first node of said two or more nodes is capable of transmitting at least one of its individual node functionality characteristic or its individual node identity characteristic to at least a second node of said two or more nodes; and
wherein said operational task is a well treatment or well servicing operation; wherein said task location is a wellsite; wherein each of said at least two nodes are mobile nodes coupled to well treating or well servicing equipment capable of assembling at a wellsite to perform a well treatment or well servicing operation; wherein said node functionality characteristics comprise well treatment or well servicing equipment type, well treatment or well servicing equipment characteristics, or a combination thereof; wherein said node identity characteristics comprise an identity code; and wherein said first node is in signal communication with one or more sensing or control devices coupled to mobile well treating or well servicing equipment and operable to monitor well treatment or well servicing operation conditions, control well treatment or well servicing operation control parameters, or a combination thereof.

31. The method of claim 30, wherein said second node is capable of establishing or modifying a network functionality of said wireless network based on respective node functionality characteristics of said first and second nodes, respective node identity characteristics of said first and second nodes, or a combination thereof.

32. The method of claim 31, wherein each of said nodes comprises a radio transceiver, and wherein said nodes are in communication with each other via spread spectrum radio transmission.

33. The method of claim 32, wherein said nodes are in communication with each other via frequency-hopping spread spectrum radio transmission.

34. The method of claim 31, wherein said second node is capable of transmitting information at least partially defining said network functionality to said first node.

35. The method of claim 34, wherein said second node is capable of establishing or modifying a network functionality of said wireless network based on human input or control, automatically without human input or control, or a combination thereof.

36. The method of claim 35, wherein said wireless network is capable of accepting additional nodes into said wireless network as said additional nodes come into communication with said second node, and wherein said wireless network is capable of releasing existing nodes that terminate communication with said second node, each of said additional or existing nodes having at least one of an individual node functionality characteristic or an individual node identity characteristic and being capable of transmitting at least one of its individual node functionality characteristic or its individual node identity characteristic to at least said second node; and wherein said second node is capable of modifying an established functionality of said wireless network based the addition of at least one of respective node functionality characteristics or respective node identity characteristics of said additional node, on the deletion of at least one of respective node functionality characteristics or respective node identity characteristics of said exiting node, or a combination thereof.

37. The method of claim 36, wherein said second node is capable of modifying an established network functionality of said wireless network based on at least one of respective node functionality characteristics of each node communicating in said wireless network or respective node identity characteristics of each node communicating in said wireless network, and on total number of nodes communicating in said wireless network.

38. The method of claim 35, wherein said second node is in signal communication with a remote location; wherein said second node is capable of transmitting network data to said remote location, said network data comprising node functionality characteristics, node identity characteristics, data acquired by one or more of said nodes, or a combination thereof; and
wherein said remote location is capable of transmitting network instructions to said second node to modify a network functionality of said wireless network, modify the node functionality of one or more of said nodes, or a combination thereof.

39. The method of claim 35, further comprising at least one third node in wireless communication with said first and second nodes, wherein said first and third nodes are capable of exchanging directly between each other at least one of network information, network instructions, acquired data, or a combination thereof.

40. The method of claim 31, wherein one or more of said at least two nodes comprises a data storage device, said data storage device capable of containing acquired data;
wherein said node comprising said data storage device is capable of automatically downloading said acquired data to another node, master node or remote location when said node comprising said data storage device comes into signal proximity with said another node, master node or remote location; and further comprising downloading said acquired data to said another node, master node or remote location when said secondary node comprising said data storage device comes into signal proximity with said another node, master node or remote location.

41. The method of claim 40, wherein said downloading comprises downloading said acquired data to a separate network for purposes of at least one of post job engineering analysis, accounting/billing, preventive maintenance, or a combination thereof.

42. The method of claim 30, wherein said at least two nodes operate as nodes in a first mobile wireless network that is in signal communication with a second mobile wireless network comprising at least two other mobile units operating as nodes; and wherein said first and second mobile wireless networks are capable of exchanging between each other at least one of network information, network instructions, acquired data, or a combination thereof.

43. The method of claim 30, wherein each of said mobile units comprises a vehicle; and wherein said method further comprises assembling said vehicles at said wellsite.

44. The method of claim 43, further comprising dynamically configuring said second node as a master node within said network.

45. The method of claim 30, wherein said well treatment or well servicing operation comprises at least one of a well stimulation operation, a well cementing operation, a coiled tubing operation, a sand control operation, or a combination thereof.

46. A method of performing an operational task with at least two mobile units, comprising:
    assembling said at least two mobile units at a task location; and
    performing said operational task;
    wherein said at least two mobile units operate as nodes in a mobile wireless network;
    wherein said at least two nodes are in wireless communication with each other, each of said nodes having at least one of an individual node functionality characteristic or an individual node identity characteristic;
    wherein at least a first node of said two or more nodes is capable of transmitting at least one of its individual node functionality characteristic or its individual node identity characteristic to at least a second node of said two or more nodes; and
    wherein said second node is capable of establishing or modifying a network functionality of said wireless network based on at least one of respective node functionality characteristics of said first and second nodes, respective node identity characteristics of said first and second nodes, or a combination thereof;
    wherein said first node comprises at least one piece of equipment operable to perform at least one action of said operational task; wherein said second node is configured as a master node capable of controlling said first node using said wireless communication by directing said at least one piece of equipment to perform said at least one action of said operation task; and wherein said performing said operational task comprises using said master node to direct that said at least one action of said operational task be performed by said at least one piece of equipment; and
    wherein said operational task comprises a well treatment or well servicing operation;
    wherein said first node comprises at least one piece of well treating or well servicing equipment operable to perform at least one well treating or well servicing action; wherein said second node is configured as a master node capable of controlling said first node using said wireless communication by directing said at least one piece of well treating or well servicing equipment to perform said at least one well treating or well servicing action; and wherein said performing said operational task comprises using said master node to direct that said at least one well treating or well servicing action be performed by said at least one piece of well treating or well servicing equipment.

47. The method of claim 46, wherein said first node comprises at least one piece of well treating or well servicing equipment operable to perform at least one well treating or well servicing action; wherein said second node is configured as a central control vehicle capable of controlling said first node using said wireless communication by directing said at least one piece of well treating or well servicing equipment to perform said at least one well treating or well servicing action; and wherein said performing said operational task comprises using said central control vehicle to direct that said at least one well treating or well servicing action be performed by said at least one piece of well treating or well servicing equipment.

48. The method of claim 46, further comprising dynamically configuring at least one of said first and second nodes within said network.

49. The method of claim 46, wherein said second node is configured as a master node capable of controlling said first node using said wireless communication; and
    wherein said performing said operational task comprises using said master node to direct the control of said well treatment or well servicing operation control parameters.

* * * * *

UNITED STATES PATENT AND TRADEMARK OFFICE
CERTIFICATE OF CORRECTION

PATENT NO. : 6,985,750 B1
APPLICATION NO. : 09/558890
DATED : January 10, 2006
INVENTOR(S) : Vicknair et al.

It is certified that error appears in the above-identified patent and that said Letters Patent is hereby corrected as shown below:

In claim 24, column 28, line 10, delete "of said".

In claim 40, column 31, lines 4-5, delete "when said secondary node," and insert --when a secondary node--.

In claim 46, column 32, line 7, delete "said operation task," and insert --said operational task--.

Signed and Sealed this

Fourth Day of March, 2008

JON W. DUDAS
*Director of the United States Patent and Trademark Office*